United States Patent
Moon et al.

(10) Patent No.: US 10,142,896 B2
(45) Date of Patent: Nov. 27, 2018

(54) APPARATUS AND METHOD FOR IDENTIFYING NEIGHBOR CELL IN WIRELESS COMMUNICATION SYSTEM

(71) Applicant: Samsung Electronics Co., Ltd., Suwon-si, Gyeonggi-do (KR)

(72) Inventors: Jung-Min Moon, Suwon-si (KR); Jaewon Kim, Seoul (KR); Seung-Hoon Park, Seoul (KR); Sunheui Ryoo, Yongin-si (KR); Jungsoo Jung, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 77 days.

(21) Appl. No.: 15/198,860

(22) Filed: Jun. 30, 2016

(65) Prior Publication Data

US 2017/0006508 A1 Jan. 5, 2017

(30) Foreign Application Priority Data

Jul. 1, 2015 (KR) ........................ 10-2015-0094167

(51) Int. Cl.
*H04W 36/00* (2009.01)
*H04W 48/12* (2009.01)

(52) U.S. Cl.
CPC .... *H04W 36/0072* (2013.01); *H04W 36/0083* (2013.01); *H04W 48/12* (2013.01)

(58) Field of Classification Search
CPC ......... H04W 36/0072; H04W 36/0083; H04W 48/12
See application file for complete search history.

(56) References Cited

U.S. PATENT DOCUMENTS

| | | | |
|---|---|---|---|
| 8,838,106 B2 | 9/2014 | Ramasamy et al. | |
| 2006/0099943 A1* | 5/2006 | Koo | H04W 48/16 455/432.1 |
| 2007/0230510 A1 | 10/2007 | You et al. | |
| 2011/0207459 A1* | 8/2011 | Ramasamy | H04W 48/20 455/436 |
| 2012/0275315 A1 | 11/2012 | Schlangen et al. | |
| 2013/0083648 A1* | 4/2013 | de Ruijter | H04L 69/40 370/216 |
| 2013/0143555 A1 | 6/2013 | Singh et al. | |
| 2015/0373654 A1 | 12/2015 | Yasukawa et al. | |

(Continued)

FOREIGN PATENT DOCUMENTS

| | | |
|---|---|---|
| EP | 2 605 589 A1 | 6/2013 |
| WO | 2009/059986 A2 | 5/2009 |
| WO | 2014/115459 A1 | 7/2014 |

*Primary Examiner* — Lakeram Jangbahadur
(74) *Attorney, Agent, or Firm* — Jefferson IP Law, LLP

(57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). A method of operating a terminal and a base station, and a terminal apparatus and base station apparatus, are provided. The method includes receiving a signal including a synchronization sequence and control information, which is transmitted from a neighbor cell, and decoding the control information based on a reception signal strength of the signal.

8 Claims, 28 Drawing Sheets

(56) References Cited

U.S. PATENT DOCUMENTS

2016/0157229 A1* 6/2016 Zhuang ............... H04L 27/2656
370/329
2016/0337992 A1* 11/2016 Sheu ................... H04W 56/001

* cited by examiner

APPARATUS AND METHOD FOR IDENTIFYING NEIGHBOR CELL IN WIRELESS COMMUNICATION SYSTEM

CROSS-REFERENCE TO RELATED APPLICATION(S)

This application claims the benefit under 35 U.S.C. § 119(a) of a Korean patent application filed on Jul. 1, 2015 in the Korean Intellectual Property Office and assigned Serial number 10-2015-0094167, the entire disclosure of which is hereby incorporated by reference.

TECHNICAL FIELD

The present disclosure relates to identifying a neighbor cell in a wireless communication system.

BACKGROUND

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid frequency shift keying (FSK) and quadrature amplitude modulation (QAM) modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The 5G or pre-5G system may use a hierarchical structure where a macro cell, a small cell, and the like coexist. In this instance, a large number of base stations (BSs) or access nodes may be installed. Therefore, in order to effectively operate a system, cells need to be efficiently identified.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure provides a method and apparatus for identifying neighbor cells in a wireless communication system.

Another aspect of the present disclosure is to provide a method and apparatus for decoding control information included in a signal transmitted from a neighbor cell in a wireless communication system.

Another aspect of the present disclosure is to provide a method and apparatus for determining a point in time for decoding the control information of a neighbor cell in a wireless communication system.

Another aspect of the present disclosure is to provide a method and apparatus for securing a duration for decoding the control information of a neighbor cell in a wireless communication system.

Another aspect of the present disclosure is to provide a method and apparatus for reporting a collision of identification information between cells in a wireless communication system.

In accordance with an aspect of the present disclosure, a method for operating a terminal in a wireless communication system is provided. The method includes receiving a signal including a synchronization sequence and control information, which is transmitted from a neighbor cell, and decoding the control information based on the reception signal strength of the signal.

In accordance with another aspect of the present disclosure, a method for operating a base station (BS) in a wireless communication system is provided. The method includes receiving, from a terminal, a first message including information associated with a collision of synchronization sequences between access nodes, and transmitting, to another terminal, a second message including the information associated with the collision.

In accordance with another aspect of the present disclosure, a terminal apparatus in a wireless communication system is provided. The apparatus includes a receiver configured to receive a signal including a synchronization sequence and control information, which is transmitted from a neighbor cell, and a processor configured to control to decode the control information based on the reception signal strength of the signal.

In accordance with another embodiment of the present disclosure, a BS in a wireless communication system is provided. The apparatus includes a receiver configured to receive, from a terminal, a first message including information associated with a collision of synchronization sequences between access nodes, and a transmitter configured to transmit, to another terminal, a second message including the information associated with the collision.

By restrictively decoding the control information of a neighbor cell in a wireless communication system, a neighbor cell may be effectively identified with low complexity.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The present disclosure relates to a technology for identifying a neighbor cell in a wireless communication system. Particularly, the present disclosure will describe various embodiments for a terminal to identify at least one cell that is different from a serving cell.

Hereinafter, the term indicating control information, the term indicating a timer, the term (e.g., an event) indicating the change of a status, the term indicating a network entity, the term indicating messages, the term indicating a component of an apparatus, and the like, which are used in the following descriptions, are used for ease of description. Therefore, the present disclosure may not be limited by the terminologies provided below, and other terms that have equivalent technical meanings may be used.

For ease of description, some of the terms and names that are defined in 3rd generation partnership project long term evolution (3GPP LTE) standards or Institute of Electrical and Electronics Engineers (IEEE) 802.11 standards may be used. However, the present disclosure may not be limited by the terms and the names, and may be equally applied to a system that complies with other standards.

Figure 1:
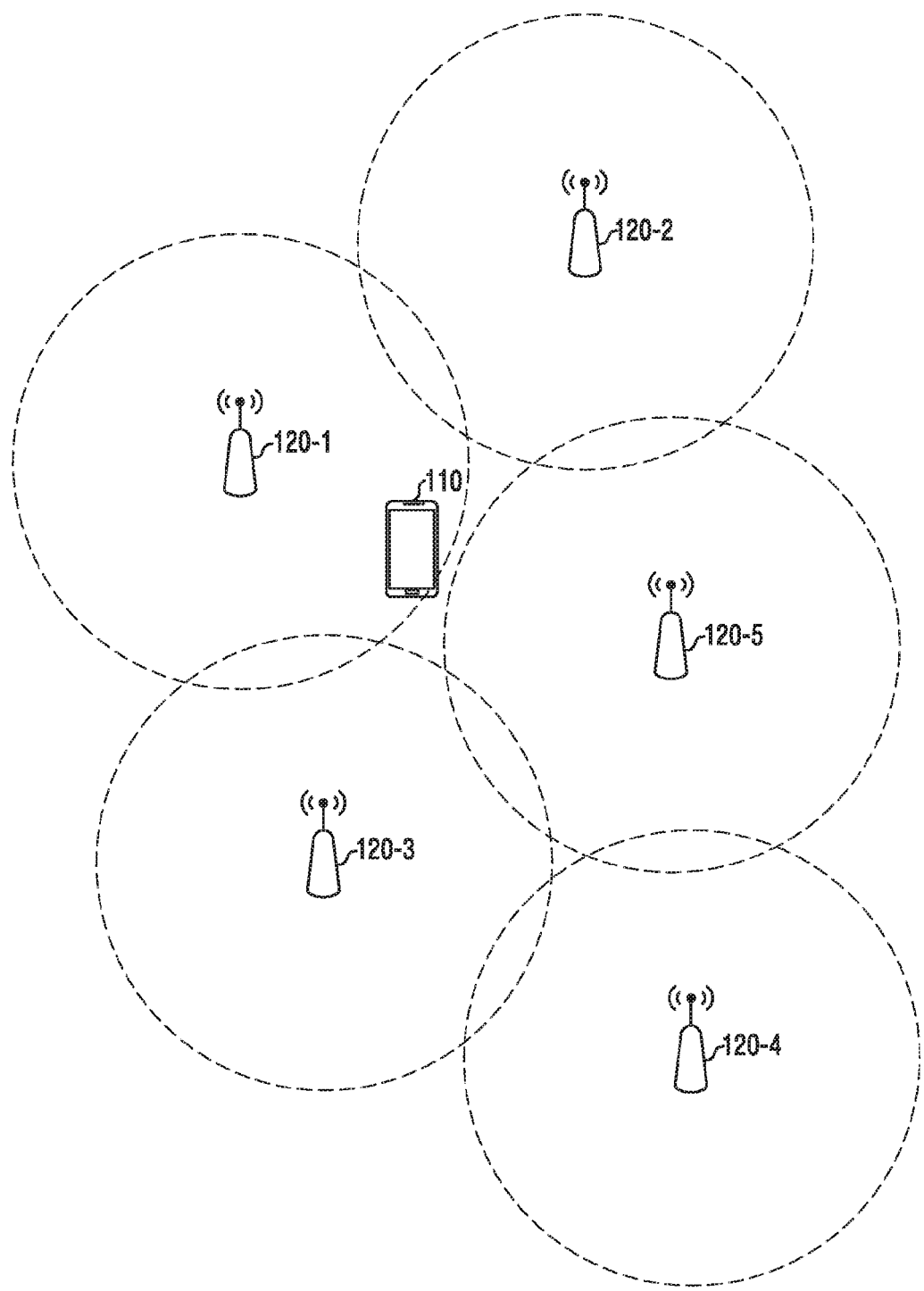
FIG. 1 illustrates a schematic configuration of a wireless communication system according to an embodiment of the present disclosure.

FIG. 1 illustrates a schematic configuration of a wireless communication system according to an embodiment of the present disclosure.

Referring to FIG. 1, a system includes a terminal 110 and a plurality of access nodes 120-1 to 120-5. Although five access nodes 120-1 to 120-5 are illustrated in FIG. 1, a larger number of access nodes may exist.

The terminal 110 is an apparatus that functions as the terminal end of a communication service, and may be a user device used by a user or the terminal end of communication between devices. The access nodes 120-1 to 120-5 may be entities that form an access network, and may provide the terminal 110 with radio access. The access nodes 120-1 to 120-5 provide radio access based on a technology defined based on an adapted communication standard, and may be referred to as a name that is different based on the adapted communication standard. The access nodes 120-1 to 120-5 may be a type of small cell that transmits and receives a signal of the 60 GHz frequency. For example, the access nodes 120-1 to 120-5 may be referred to as an access point (AP), a base station (BS), an evolved node-B (eNB), and the like. According to the movement of the terminal 110, a serving node or a serving cell that provides the terminal 110 with radio access may be changed.

In the environment as illustrated in FIG. 1, the terminal 110 may identify a neighbor cell for various purposes, such as handover, the estimation of a location, and the like. The terminal 110 may determine the identification information of other cells that are different from a serving cell, which are located within a distance where the reception of a signal is possible. To this end, the terminal 110 detects or decodes signals including identification information transmitted from neighbor cells. The signal including the identification information may be referred to as a beacon. For example, the signal may be configured as illustrated in FIGS. 2A and 2B.

Figure 2A:
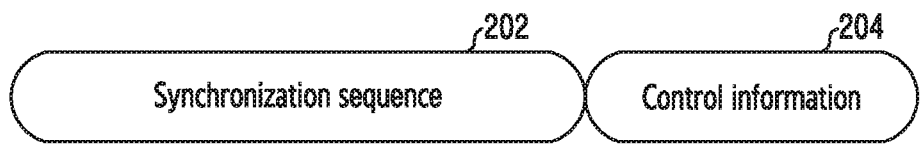
FIGS. 2A and 2B illustrate structures of a signal for identifying a cell in a wireless communication system according to an embodiment of the present disclosure.
Figure 2B:
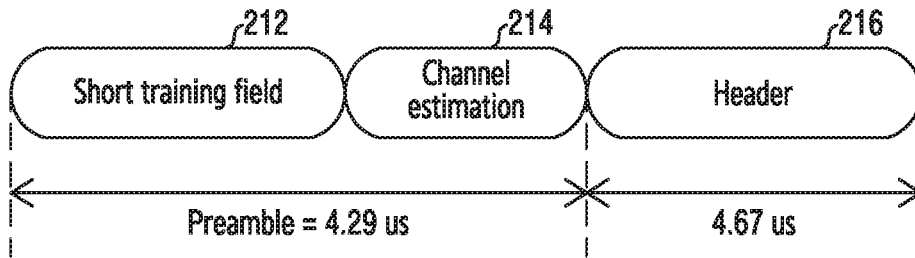

FIGS. 2A and 2B illustrate structures of a signal for identifying a cell in a wireless communication system according to an embodiment of the present disclosure. FIG. 2A illustrates an example of the structure of a signal and FIG. 2B illustrates a detailed example.

Referring to FIG. 2A, a signal includes a synchronization sequence 202 and control information 204. The synchronization sequence 202 may have a predetermined length, and may be defined by a predetermined value. Each access node may use one of a plurality of candidate values as the synchronization sequence 202. The control information 204 may include identification information allocated to a corresponding access node. The identification information may be referred to as a cell identifier. Accordingly, a terminal may determine the existence of a signal and a starting location based on the synchronization sequence 202. In this instance, the terminal may preliminarily identify a corresponding access node based on the value of the synchronization sequence 202. Subsequently, the terminal may accurately identify the corresponding access node by decoding the control information 204.

Referring to FIG. 2B, the signal may include a short training field 212, a channel estimation field 214, and a header 216. The short training field 212 and the channel estimation field 214 may be referred to as a 'preamble', and may have a length of 4.29 μs. The header 216 may have a length of 4.67 μs. The preamble may correspond to the synchronization sequence 202 of FIG. 2A, and the header 216 may correspond to the control information 204 of FIG. 2A. In this instance, the header 216 may further include additional control information in addition to the control information 204. For example, the header 216 may further include beamforming related information and access related information.

As described above, the terminal may identify neighbor cells using signals transmitted from the neighbor cells. In this instance, the average number of neighbor cells detected may change based on, particularly, the deployment of cells, a transmission power, a channel gain, and the like. An example of the number of times that neighbor cells are detected is described below.

Figure 3:
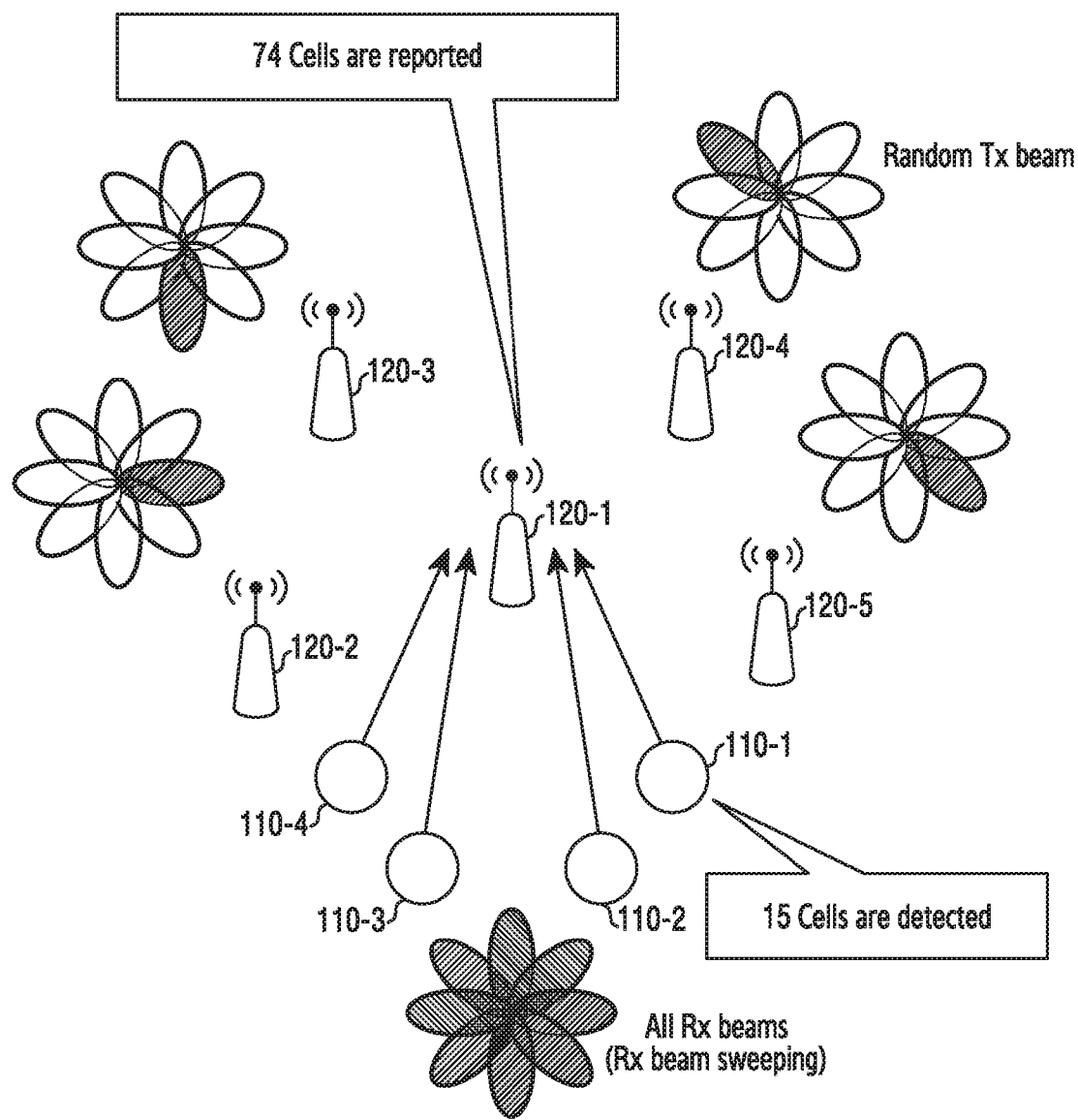
FIG. 3 illustrates an example of an environment where neighbor cells are detected in a wireless communication system according to an embodiment of the present disclosure.

FIG. 3 illustrates an example of an environment where neighbor cells are detected in a wireless communication system according to an embodiment of the present disclosure.

Referring to FIG. 3, access nodes 120-1 to 120-5 may perform transmission beamforming, and terminals 110-1 to 110-4 may perform reception beamforming. In this instance, the access nodes 120-1 to 120-5 may perform random transmission beamforming using a beam in a predetermined direction, and the terminals 110-1 to 110-4 may perform beam sweeping using all of the reception beams. The result of the simulation shows that each of the terminals 110-1 to 110-4 detects approximately 15 neighbor cells. Neighbor cells detected by the terminals 110-1 to 110-4 are reported to a serving cell, and approximately 74 neighbor cells are reported for each access node.

Referring to FIG. 3, when different synchronization sequences are allocated to the access nodes 120-1 to 120-5, respectively, each cell may be identified with low complexity. This is because the cells may be identified by only detecting a synchronization sequence. However, to completely identify all of the cells using only a synchronization sequence, the number of allocable preambles (i.e., the number of synchronization sequences) needs to be larger than the number of access nodes. Since the number of resources that are usable for synchronization sequences are limited, and thus, the number of allocable sequence candidates may also be limited. Therefore, the environment illustrated in FIG. 4 needs to be taken into consideration.

Figure 4:
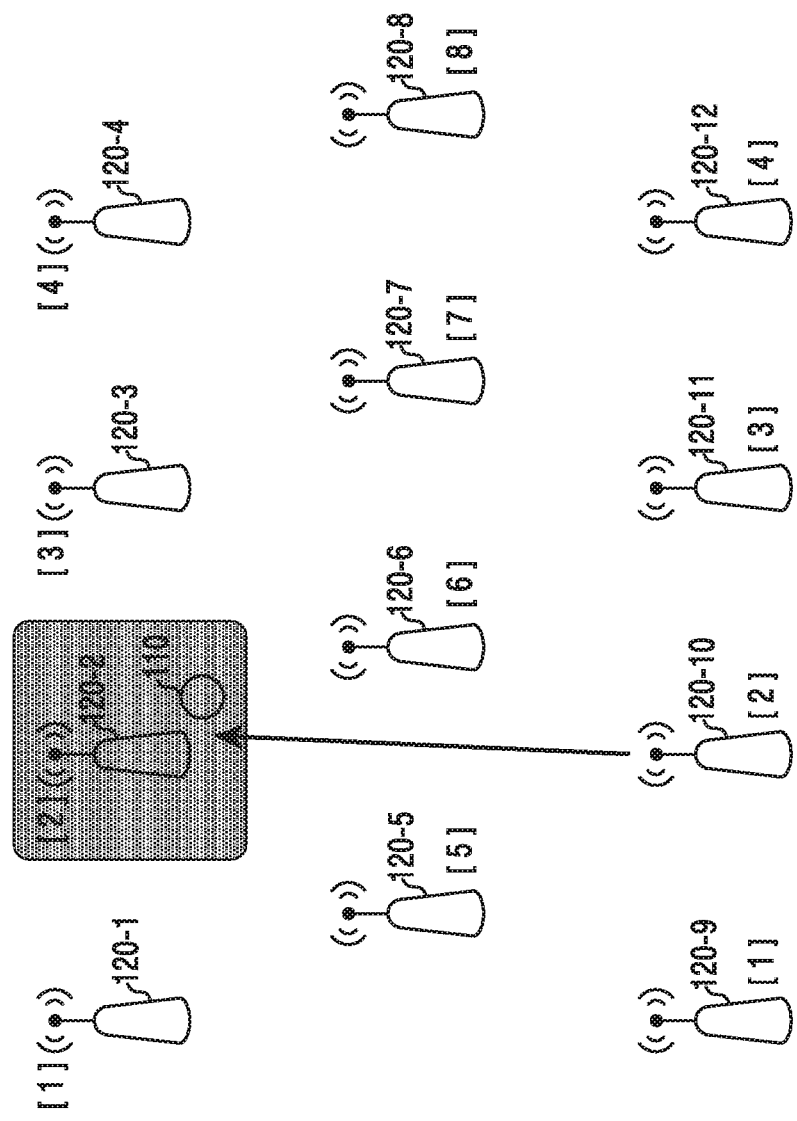
FIG. 4 illustrates an example of an environment where different access nodes use an identical synchronization sequence in a wireless communication system according to an embodiment of the present disclosure.

FIG. 4 illustrates an example of an environment where different access nodes use an identical synchronization sequence in a wireless communication system according to an embodiment of the present disclosure.

Referring to FIG. 4, a plurality of access nodes 120-1 to 120-12 are installed, and the terminal 110 is connected to the access node 120-1. Each of the access nodes 120-1 to 120-12, a synchronization sequence of a predetermined index may be allocated. In this instance, an identical synchronization sequence (for example, a synchronization sequence having an index 2) may be allocated to the access nodes 120-2 to 120-10. Therefore, when the terminal 110 receives a signal including a synchronization sequence from the access node 120-10, the terminal 110 may not clearly identify the transmitter of the signal. In this instance, the situations as illustrated in FIGS. 5A and 5B may occur.

Figure 5A:
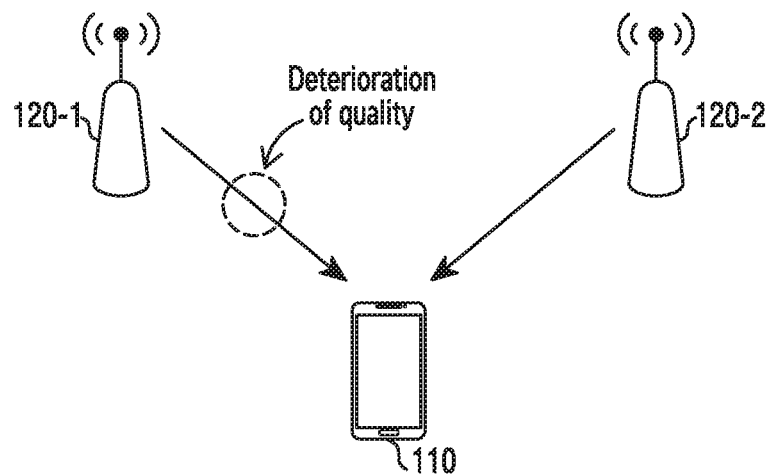
FIGS. 5A and 5B illustrate situations that may occur when different access nodes use an identical synchronization sequence in a wireless communication system according to an embodiment of the present disclosure.
Figure 5B:
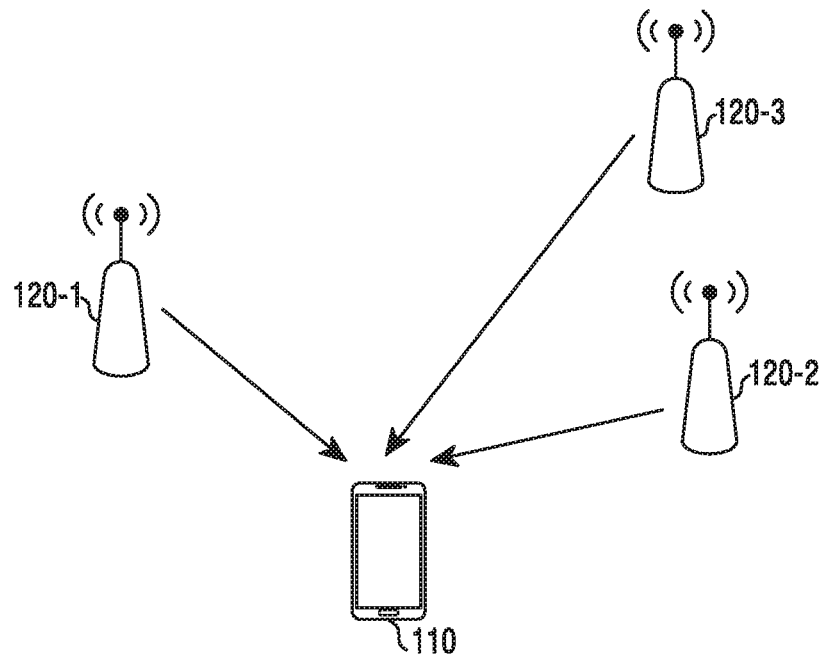

FIGS. 5A and 5B illustrate situations that may occur when different access nodes use an identical synchronization sequence in a wireless communication system according to an embodiment of the present disclosure. FIG. 5A illustrates the case in which a serving cell and a neighbor cell use an identical synchronization sequence, and FIG. 5B illustrates the case in which neighbor cells use an identical synchronization sequence.

Referring to FIG. 5A, the access node 120-1 is the serving cell of the terminal 110, and the access node 120-2 is a neighbor cell. The access node 120-1 and the access node 120-2 may use an identical synchronization sequence. When the reception strength of a signal from the serving cell is greater than the reception strength of a signal from the neighbor cell, the terminal 110 may detect only the signal of the serving cell, for example, the signal of the access node 120-1. However, when the quality of a channel with the access node 120-1 deteriorates, the terminal 110 may detect the signal of the neighbor cell, for example, the signal of the access node 120-2. As a result, there may be a situation in which the terminal 110 mistakes the signal of the access node 120-2 as the signal of the access node 120-1. However, the terminal 110 continuously detects control information included in the signal of the serving cell, and thus, the terminal 110 may recognize the situation illustrated in FIG. 5A.

Referring to FIG. 5B, the access node 120-1 is the serving cell of the terminal 110, and the access nodes 120-2 and 120-3 are neighbor cells. The access node 120-2 and the access node 120-3 may use an identical synchronization sequence. Therefore, although the terminal 110 receives a signal from one of the access node 120-2 and the access node 120-3, the terminal may not clearly identify the transmitter of the signal. In addition, unlike the situation of FIG. 5A, the situation of FIG. 5B may be difficult to be recognized by the terminal 110. This is because it is not secured that the terminal 110 continuously decodes control information included in a signal received from a neighbor cell.

Figure 6:
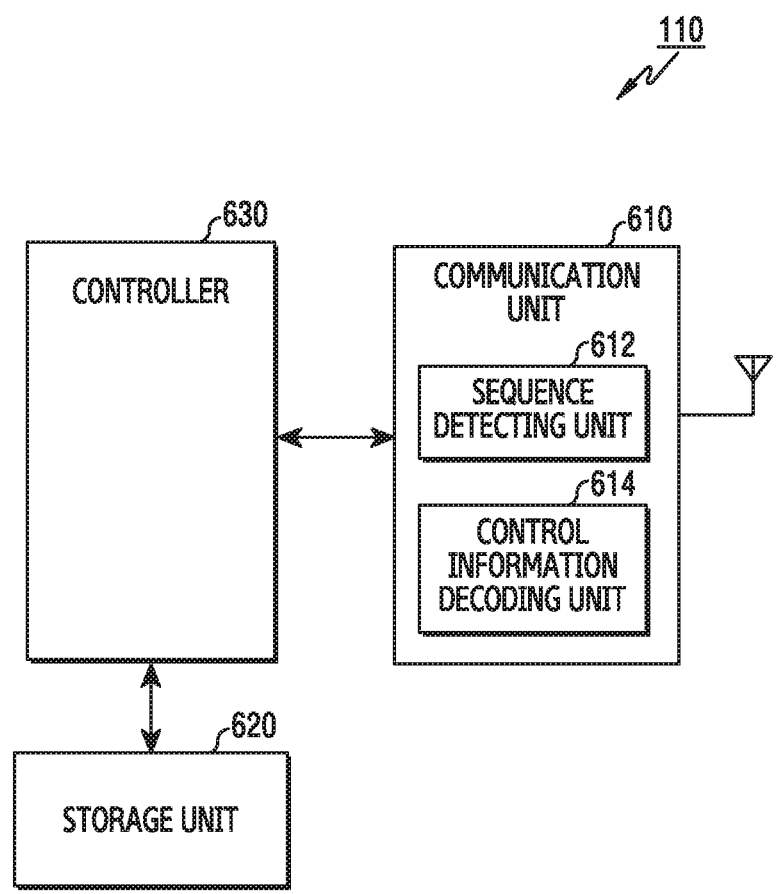
FIG. 6 is a block diagram of a terminal in a wireless communication system according to an embodiment of the present disclosure.

FIG. 6 is a block diagram of a terminal in a wireless communication system according to an embodiment of the present disclosure. Hereinafter, the terms such as '-unit', ending such as '-er', '-or', and the like indicate a unit that processes at least one function or operation, which may be embodied by hardware, software, or a combination thereof.

Referring to FIG. 6, the terminal includes a communication unit 610, a storage unit 620, and a controller 630.

The communication unit 610 executes functions for transmitting and receiving signals through a wireless channel. For example, the communication unit 610 executes a function to convert between a baseband signal and a bit stream, based on the physical layer standards of a system. For example, when data is transmitted, the communication unit 610 encodes and modulates a transmission bit stream, so as to generate complex symbols. Also, when data is received, the communication unit 610 decodes and demodulates a baseband signal, so as to restore a reception bit stream. The communication unit 610 up-converts a baseband signal into a radio frequency (RF) band signal and transmits the RF signal through an antenna, and down-converts an RF band signal received through the antenna into a baseband signal. The communication unit 610 may include a transmission filter, a reception filter, an amplifier, a mixer, an oscillator, a digital to analog convertor (DAC), an analog to digital convertor (ADC), or the like.

The communication unit 610 may also include a plurality of RF chains. In addition, the communication unit 610 may perform beamforming. To execute beamforming, the communication unit 610 may adjust the phase and the size of each signal that is transmitted or received through a plurality of antennas or antenna elements. The communication unit 610 may further include a plurality of communication modules for supporting a plurality of different radio access technologies. The communication unit 610 may include different communication modules for processing signals in different frequency bands. For example, the different communication standards may include Bluetooth low energy (BLE), wireless fidelity (Wi-Fi), Wi-Fi gigabyte (WiGig), a cellular network (e.g., long term evolution (LTE)), and the like.

The communication unit 610 may include a sequence detecting unit 612 for detecting a synchronization sequence from a received signal, and may include a control information decoding unit 614 for decoding control information included in the received signal. The sequence detecting unit 612 may calculate the correlation of a part including a synchronization sequence out of the received signal with a plurality of candidate sequences. Based on the result of the correlation operation, a transmitted sequence may be determined. The control information decoding unit 614 may decode control information based on a scheme corresponding to an encoding scheme and a coding rate which are used for encoding the control information including the identification information. For example, low density parity code (LDPC) may be used.

The communication unit 610 may transmit and receive a signal as described above. Accordingly, the communication unit 610 may also be referred to as a transmitting unit, a receiving unit, or a transceiving unit. The transmission and reception performed through a wireless channel, which is described below, may be used as a meaning that includes that the above described processing is performed by the communication unit 610.

The storage unit 620 may store data, such as a basic program for operating a terminal, an application program, configuration information, and the like. The storage unit 620 may be configured as a volatile memory, a non-volatile memory, or a combination of a volatile memory and a non-volatile memory. In addition, the storage unit 620 may provide data stored therein in response to a request from the controller 630.

The controller 630 may control general operations of a terminal. For example, the controller 630 may transmit and receive signals through the communication unit 610. In addition, the controller 630 may record and read data in the storage unit 620. To this end, the controller 630 may include at least one of a processor and a micro-processor, or may be a part of the processor. A part of the communication unit 610 and the controller 630 may be referred to as a communication processor (CP). For example, the controller 630 may control a terminal to execute the procedures illustrated in FIGS. 8 to 12, FIG. 15, FIGS. 19-21, FIG. 24, FIG. 26, and FIG. 27.

As illustrated in FIG. 6, the communication unit 610 of the terminal may include the sequence detecting unit 612 and the control information decoding unit 614. To effectively decode control information transmitted from neighbor cells, the detailed configuration of the sequence detecting unit 612 and the control information decoding unit 614 may be designed in various ways. For example, the detailed configuration of the sequence detecting unit 612 and the control information decoding unit 614 may be as shown in FIGS. 7A and 7B.

Figure 7A:
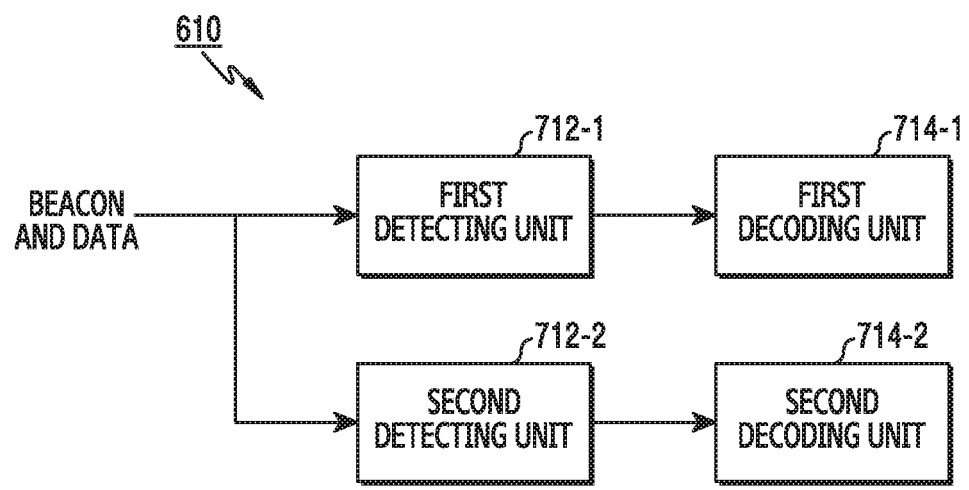
FIGS. 7A and 7B illustrate examples of an implementation of a means for detecting and decoding a signal in a wireless communication system according to an embodiment of the present disclosure.
Figure 7B:
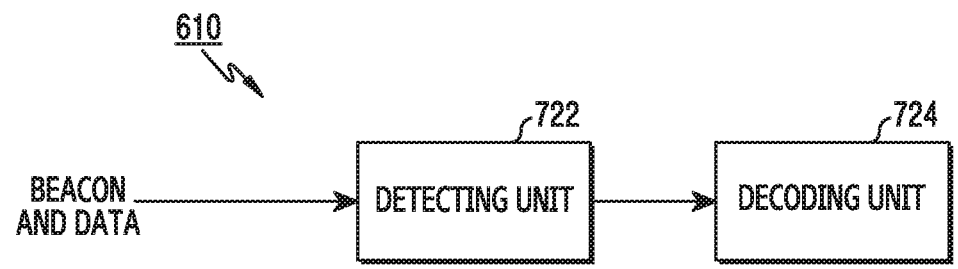

FIGS. 7A and 7B illustrate examples of an implementation of a means for detecting and decoding a signal in a wireless communication system according to an embodiment of the present disclosure. FIGS. 7A and 7B are examples of the detailed configuration of the communication unit 610 of FIG. 6. FIG. 7A illustrates the case in which a means for detecting and decoding a signal is separately added for processing signals of neighbor cells. FIG. 7B illustrates the case in which a means for detecting and decoding a signal processes the signals of both a serving cell and a neighbor cell.

Referring to FIG. 7A, the communication unit 610 may include a first detecting unit 712-1, a first decoding unit 714-1, a second detecting unit 712-2, and a second decoding unit 714-2. The first detecting unit 712-1, the first decoding unit 714-1, the second detecting unit 712-2, and the second decoding unit 714-2 may process a beacon signal and a data signal. In this instance, the first detecting unit 712-1 and the first decoding unit 714-1 process a signal from a serving cell. The second detecting unit 712-2 and the second decoding unit 714-2 process a signal from a neighbor cell. To this end, although not illustrated in FIGS. 7A and 7B, a module may be further included for classifying a signal from the serving cell and a signal from a neighbor cell. As described above, the number of allocable sequences is limited, and thus, for the accurate identification of cells, a terminal needs to determine identification information by decoding control information. Although the terminal is equipped with at least one detecting and decoding means, the detecting and decoding means is generally and preferentially used for decoding a signal from the serving cell. Therefore, an additional detecting and decoding means is required to smoothly decode a signal from a neighbor cell. Accordingly, the design as illustrated in FIG. 7A may be considered. However, complexity and cost may increase due to additional hardware.

Referring to FIG. 7B, the communication unit 610 may include a single detecting unit 722 and a single decoding unit 724. The detecting unit 722 and the decoding unit 724 may process a beacon signal and a data signal. That is, in the case of FIG. 7B, a terminal may restrictively perform decoding without using additional hardware when decoding control information associated with neighbor cells is needed, and thus, may selectively identify neighbor cells. When control information associated with neighbor cells is decoded, the decoding unit 724 may not be used for decoding a data signal from the serving BS. Accordingly, the serving BS may restrict scheduling data transmission to the terminal so that the decoding unit 724 may decode the control information associated with neighbor cells. The terminal may determine a point in time that requires decoding the control information of neighbor cells (that is, a gap for decoding the control information of neighbor cells), and may decode the control information in the determined gap.

Figure 8:
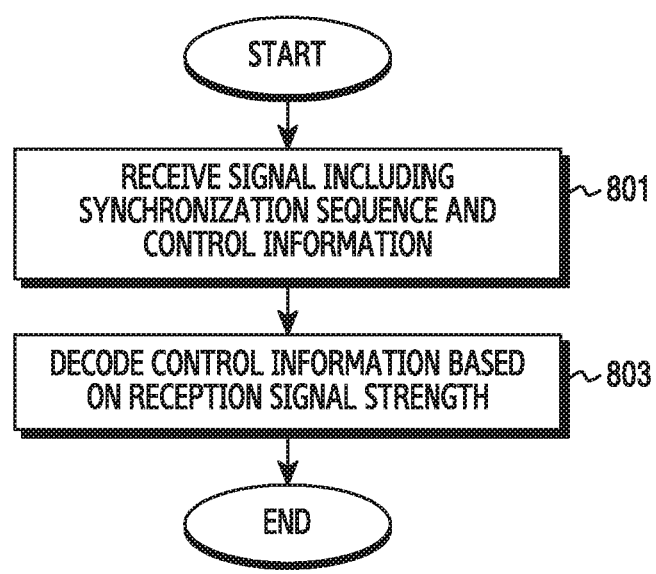
FIG. 8 illustrates an operation procedure of a terminal in a wireless communication system according to an embodiment of the present disclosure.

FIG. 8 illustrates an operation procedure of a terminal in a wireless communication system according to an embodiment of the present disclosure. FIG. 8 illustrates the operation method of the terminal 110.

Referring to FIG. 8, the terminal receives a signal including a synchronization sequence and control information in operation 801. The signal may be received from a neighbor cell. The signal is a signal for informing of the existence of a corresponding node, and may be referred to as a 'beacon'. The synchronization sequence may be located in the front end of a signal, and may be referred to as a 'preamble'. The control information may include information required for accessing a corresponding node. For example, the control information may include the identification information of a corresponding node, beamforming-related information, and the like.

At operation 803, the terminal decodes control information based on a reception signal strength. When the signal received in operation 801 is received from a neighbor cell that is different from a serving cell, the terminal may restrictively decode control information. The terminal determines whether to decode the control information based on the reception signal strength associated with the serving cell and the reception signal strength associated with a neighbor cell, which transmits the signal received in operation 801. Here, the reception signal strength associated with the neighbor cell may be measured by detecting the synchronization sequence included in the signal.

Although not illustrated in FIG. 8, according to another embodiment of the present disclosure, the terminal may transmit a message for requesting the allocation of a gap for decoding control information. Accordingly, a probability of losing a data signal may be decreased.

Figure 9:
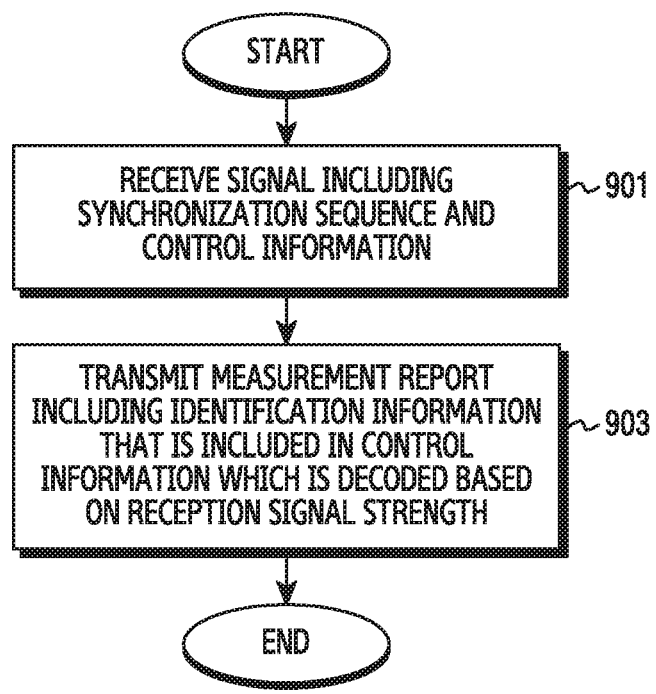
FIG. 9 illustrates an operation procedure of a terminal in a wireless communication system according to an embodiment of the present disclosure.

FIG. 9 illustrates another operation procedure of a terminal in a wireless communication system according to an embodiment of the present disclosure. FIG. 9 illustrates the operation method of the terminal 110.

Referring to FIG. 9, the terminal receives a signal including a synchronization sequence and control information in operation 901. The signal may be received from a neighbor cell. The signal is a signal for informing of the existence of a corresponding node, and may be referred to as a 'beacon'. The synchronization sequence may be located in the front end of a signal, and may be referred to as a 'preamble'. The control information may include information required for accessing a corresponding node. For example, the control information may include the identification information of a corresponding node, beamforming-related information, and the like.

At operation 903, the terminal transmits, to a serving cell, a measurement report including identification information included in control information decoded based on a reception signal strength. The serving cell may be an access node (e.g., a cellular BS) of a type that is different from an access node (e.g., AP) of a neighbor cell. When the signal received in operation 901 is received from a neighbor cell that is different from the serving cell, the terminal may restrictively decode control information. The terminal determines whether to decode the control information based on the reception signal strength associated with the serving cell and the reception signal strength associated with a neighbor cell which transmits the signal received in operation 901. The reception signal strength associated with the neighbor cell may be measured by detecting the synchronization sequence included in the signal.

Figure 10:
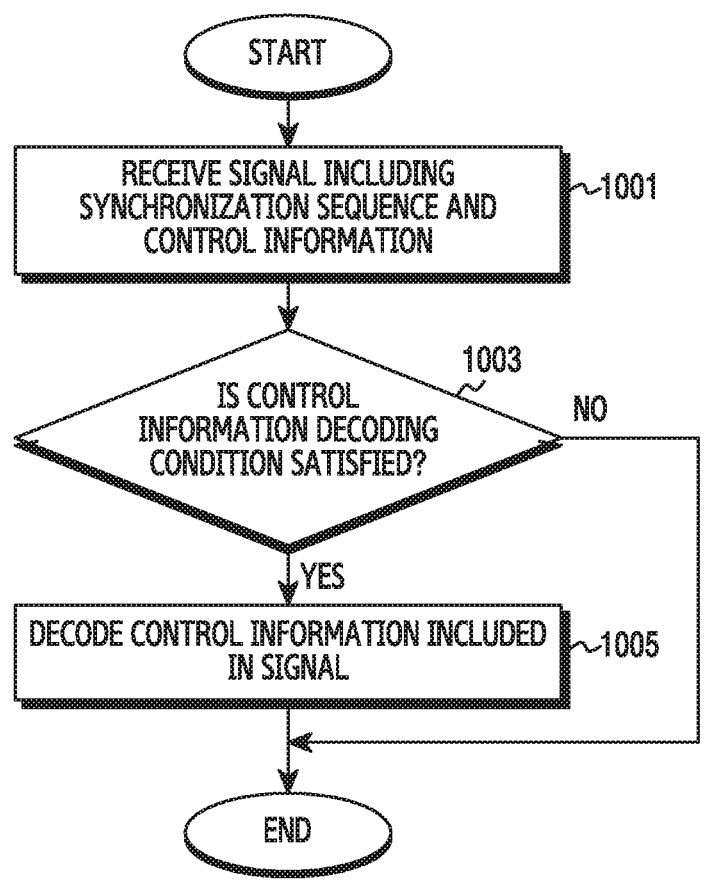
FIG. 10 illustrates an operation procedure of a terminal in a wireless communication system according to an embodiment of the present disclosure.

FIG. 10 illustrates another operation procedure of a terminal in a wireless communication system according to an embodiment of the present disclosure. FIG. 10 illustrates the operation method of the terminal 110.

Referring to FIG. 10, the terminal receives a signal including a synchronization sequence and control information in operation 1001. The signal may be received from a neighbor cell. The signal is a signal for informing of the existence of a corresponding node, and may be referred to as a 'beacon'. The synchronization sequence may be located in the front end of a signal, and may be referred to as a 'preamble'. The control information may include information required for accessing a corresponding node. For example, the control information may include the identification information of a corresponding node, beamforming-related information, and the like.

At operation 1003, the terminal determines whether a condition for decoding control information is satisfied. When the signal received in operation 1001 is received from a neighbor cell that is different from a serving cell, the terminal may restrictively decode control information. For example, the condition for decoding may be defined based on a reception signal strength. Particularly, the condition for decoding may be defined as a situation in which the reception signal strength associated with a neighbor cell is greater than the sum of the reception signal strength associated with the serving cell and a predetermined offset. The reception signal strength associated with the neighbor cell may be measured by detecting the synchronization sequence included in the signal.

When the condition for decoding is satisfied, the in operation 1005, the terminal may decode control information included in the signal. Accordingly, the terminal may determine the identification information of a neighbor cell included in the control information.

According to various embodiments of the present disclosure, a decoding operation for obtaining the identification information of neighbor cells may be initiated based on various conditions. For example, decoding may be performed in response to an event, a request, and multiple events. Furthermore, in an environment where different types of access nodes coexist in a system, when a connection with a BS is provided together, decoding control information may be performed using the support of the BS. The above described embodiments may be classified as shown in Table 1.

TABLE 1

| Schemes | Descriptions |
| --- | --- |
| Event-based | Decode identification information when an event occurs |
| Request-based | request a gap for decoding identification information |
| Multiple events-based | Determine a point in time for initiating decoding using a separate event |
| the support of a BS | Define an event associated with detecting sequence collision Decode identification information based on broadcasted collision information |

Various embodiments classified as described above may be embodied independently, or two or more embodiments may be combined and embodied. The procedure for each case is described below.

The event-based control information decoding is a scheme of decoding control information when a predetermined event occurs. In this instance, when an event occurs, control information may be continuously decoded during a predetermined duration of time.

When control information associated with a neighbor cell is decoded, it is preferable that the starting point and the end point of decoding are clear. Therefore, according to an embodiment of the present disclosure, the starting point may be defined when an entering condition associated with an event is satisfied, and the end point may be defined when a leaving condition associated with the event is satisfied or a timer corresponding to the event expires. When a handover event is used as an event, the terminal may decode control information only when the occurrence of a handover is expected. The event-based control information decoding is described below with reference to FIG. 11.

Figure 11:
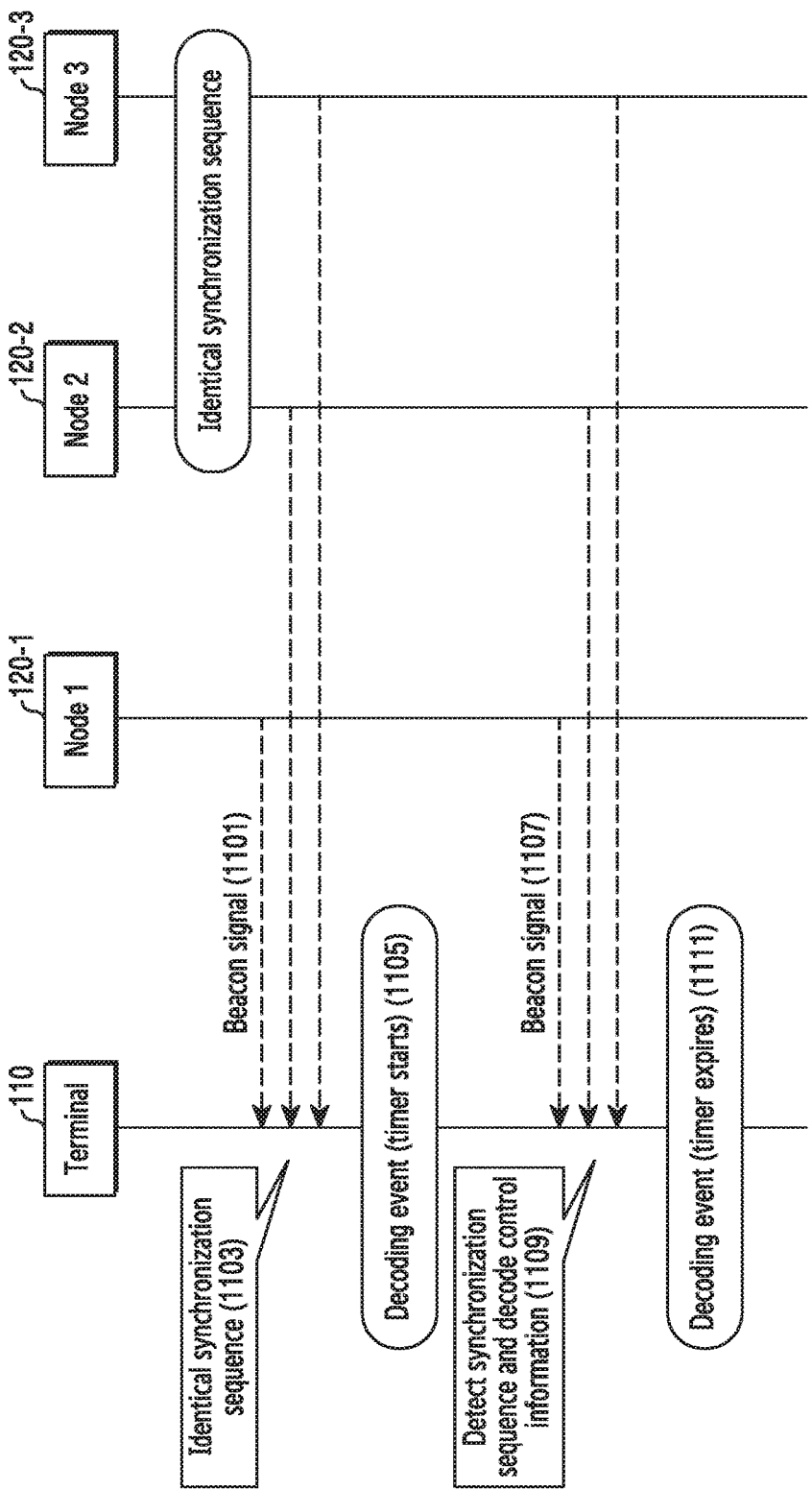
FIG. 11 illustrates a procedure of event-based control information decoding in a wireless communication system according to an embodiment of the present disclosure.

FIG. 11 illustrates a procedure of event-based control information decoding in a wireless communication system according to an embodiment of the present disclosure. FIG. 11 illustrates a procedure that initiates decoding the control information of a neighbor cell based on the occurrence of an event. FIG. 11 illustrates the case in which decoding the control information of a neighbor cell is restricted based on the occurrence of an event.

Referring to FIG. 11, the terminal 110 is connected to the node 1 120-1. The node 2 120-2 and the node 3 120-3 are neighbor cells, and may use an identical synchronization sequence. The terminal 110 may be located in a location where signals from the node 2 120-2 and the node 3 120-3 may be detected.

In operation 1101, each of the node 1 120-1, the node 2 120-2, and the node 3 120-3 transmits a beacon signal. The beacon signal is a signal for informing of the existence of a corresponding node. The beacon signal includes a synchronization sequence and identification information, which are allocated to a corresponding node. The beacon signal may be transmitted periodically.

In operation 1103, the terminal 110 may detect synchronization sequences included in beacon signals which are transmitted from the node 1 120-1, the node 2 120-2, and the node 3 120-3, respectively. The terminal 110 may detect at least one synchronization sequence through a correlation operation. The node 2 120-2 and the node 3 120-3 have an identical synchronization sequence, and thus, the terminal 110 may not be capable of distinguishing the node 2 120-2 and the node 3 120-3. In this instance, the terminal 110 may measure a reception signal strength using a synchronization sequence. The reception signal strength may be measured for each synchronization sequence. In the case of FIG. 11, the reception signal strength associated with a synchronization sequence used by the node 1 120-1, and the reception signal strength associated with a synchronization sequence used by the node 2 120-2 and the node 3 120-3 may be measured.

In operation 1105, the terminal 110 determines the occurrence of an event for decoding control information. Hereinafter, for ease of description, an event for decoding control information may be referred to as a 'decoding event'. The terminal 110 may start a timer for calculating a duration where decoding is maintained. The event may be defined by the reception signal strength associated with a serving cell and the reception signal strength associated with a neighbor cell. Particularly, the event may be defined as a situation in which the reception signal strength associated with a neighbor cell is greater than the sum of the reception signal strength associated with the serving cell and a predetermined offset. The decoding event may be an event defined separately for an operation of decoding control information, or may be an event defined for another purpose (e.g., a handover event).

In operation 1107, each of the node 1 120-1, the node 2 120-2, and the node 3 120-3 transmits a beacon signal. After operation 1101, as a single period elapses, each of the node 1 120-1, the node 2 120-2, and the node 3 120-3 may transmit a beacon signal again. The beacon signal includes a synchronization sequence and identification information, which are allocated to a corresponding node.

In operation 1109, the terminal 110 may detect synchronization sequences included in beacon signals which are transmitted from the node 1 120-1, the node 2 120-2, and the node 3 120-3, respectively. In addition, the terminal 110 decodes control information included in beacon signals. In other words, the terminal 110 decodes control information included in a beacon signal, and determines identification information. The identification information includes a cell identifier.

In operation 1111, the terminal 110 determines the termination of the decoding event. The terminal 110 determines the termination of the decoding event by determining the expiration of the timer. When a condition defined for terminating the event is satisfied, the terminal 110 may determine the termination of the decoding event. When a condition defined for terminating the event is satisfied, the terminal 110 may determine the termination of the decoding event. Accordingly, the terminal 110 may not decode control information although beacon signals transmitted from the node 2 120-2 and the node 3 120-3 are detected. However, when a decoding event occurs again, the terminal 110 may decode control information transmitted from a neighbor cell during a duration indicated by the timer.

According to the above described event-based control information decoding, when a predetermined event occurs, the control information of neighbor cells are decoded during a corresponding duration. According to various embodiments of the present disclosure, the control information of neighbor cells may be decoded during a gap that is agreed by a serving cell. To this end, when an event occurs, the terminal requests a gap for decoding control information from an access node of the serving cell. The gap for decoding control information is a time gap in which the serving cell does not transmit data to the terminal so that the terminal decodes the control information of a neighbor cell. The gap request-based control information decoding is described below with reference to FIG. 12.

Figure 12:
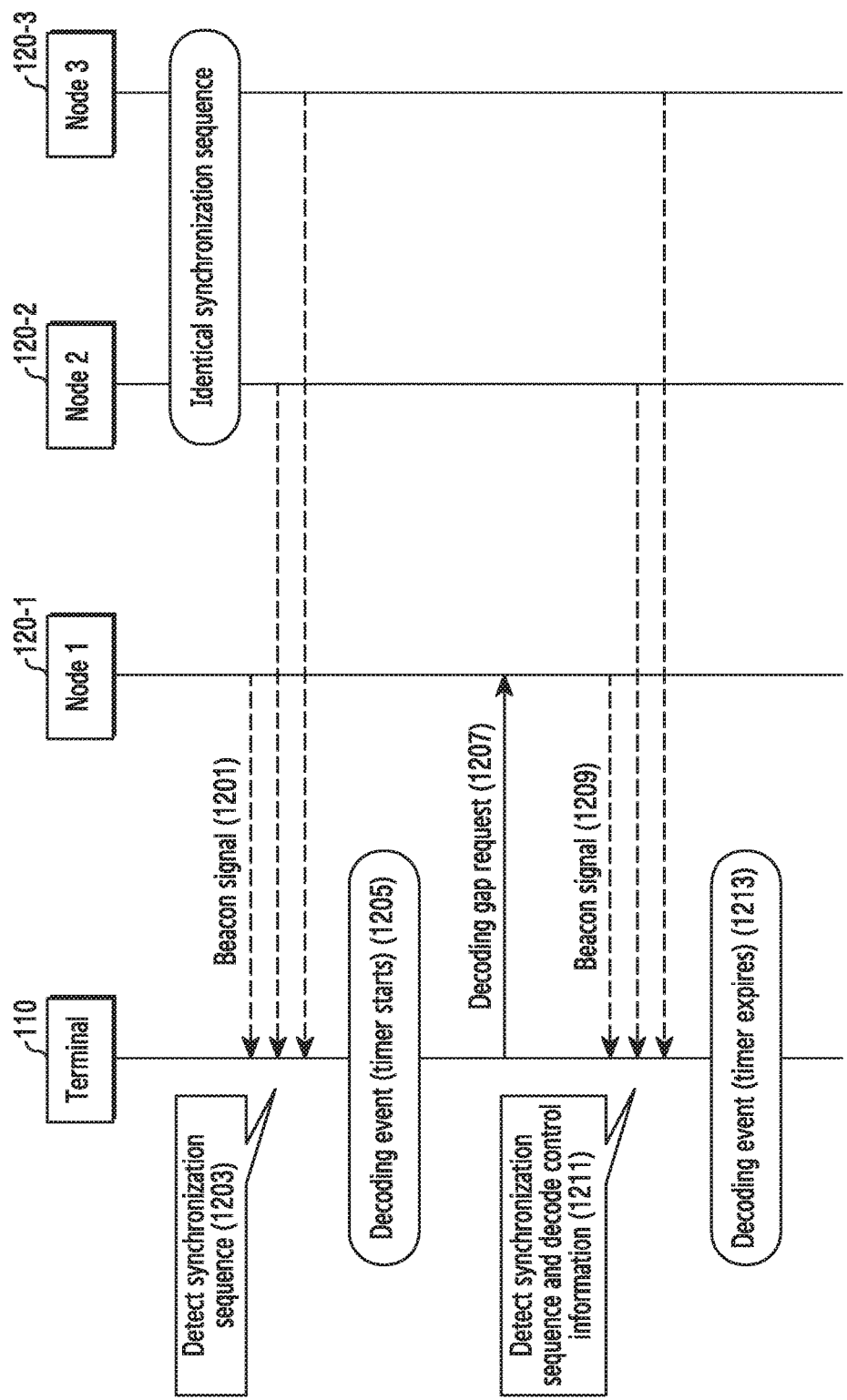
FIG. 12 illustrates a procedure of gap request-based control information decoding in a wireless communication system according to an embodiment of the present disclosure.

FIG. 12 illustrates a procedure of gap request-based control information decoding in a wireless communication system according to an embodiment of the present disclosure. FIG. 12 illustrates a decoding procedure performed during a gap allocated by request. FIG. 12 illustrates the case in which decoding the control information of a neighbor cell is restricted based on the requested gap.

Referring to FIG. 12, the terminal 110 is connected to the node 1 120-1. The node 2 120-2 and the node 3 120-3 are neighbor cells, and may use an identical synchronization sequence. The terminal 110 may be located in a location where signals from the node 2 120-2 and the node 3 120-3 may be detected.

In operation 1201, each of the node 1 120-1, the node 2 120-2, and the node 3 120-3 transmits a beacon signal. The beacon signal is a signal to indicate the existence of a corresponding node. The beacon signal includes a synchronization sequence and identification information, which are allocated to a corresponding node. The beacon signal may be transmitted periodically.

In operation 1203, the terminal 110 may detect synchronization sequences included in beacon signals which are transmitted from the node 1 120-1, the node 2 120-2, and the node 3 120-3, respectively. The terminal 110 may detect at least one synchronization sequence through a correlation operation. The node 2 120-2 and the node 3 120-3 have an identical synchronization sequence, and thus, the terminal 110 may not be capable of distinguishing the node 2 120-2 and the node 3 120-3. In this instance, the terminal 110 may measure a reception signal strength using a synchronization sequence. The reception signal strength may be measured for each synchronization sequence. In the case of FIG. 12, the reception signal strength associated with a synchronization sequence used by the node 1 120-1, and the reception signal strength associated with a synchronization sequence used by the node 2 120-2 and the node 3 120-3 may be measured.

In operation 1205, the terminal 110 determines the occurrence of a decoding event. The terminal 110 may start a timer for calculating a duration where decoding is maintained. The event may be defined by the reception signal strength associated with a serving cell and the reception signal strength associated with a neighbor cell. Particularly, the event may be defined as a situation in which the reception signal strength associated with a neighbor cell is greater than the sum of the reception signal strength associated with the serving cell and a predetermined offset. The decoding event may be an event defined separately for an operation of decoding control information, or may be an event defined for another purpose (e.g., a handover event).

In operation 1207, the terminal 110 transmits a request for a gap for decoding control information (decoding gap request) to the node 1 120-1, which is a serving cell. Accordingly, the node 1 120-1 allocates a decoding gap for decoding the control information of neighbor cells to the terminal 110. Here, detailed resources for the decoding gap is defined in advance, or may be determined through the previous negotiation or the negotiation performed together with the request. Although not illustrated in FIG. 12, the node 1 120-1 may transmit acknowledge (hereinafter, 'ACK') in response to the request.

In operation 1209, each of the node 1 120-1, the node 2 120-2, and the node 3 120-3 transmits a beacon signal. After operation 1201, as a single period elapses, each of the node 1 120-1, the node 2 120-2, and the node 3 120-3 may transmit a beacon signal again. The beacon signal includes a synchronization sequence and identification information, which are allocated to a corresponding node.

In operation 1211, the terminal 110 may detect synchronization sequences included in beacon signals which are transmitted from the node 1 120-1, the node 2 120-2, and the node 3 120-3, respectively. In addition, the terminal 110 decodes control information included in beacon signals. In other words, the terminal 110 decodes control information included in a beacon signal, and determines identification information. The identification information includes a cell identifier. In this instance, the terminal 110 may use a means of decoding (e.g., the control information decoding unit 614) to decode the identification information of neighbor cells during the decoding gap allocated by request. The decoding gap may include a single contiguous resource, or a plurality of resources allocated periodically. The detailed allocation of the decoding gap is described below with reference to FIGS. 13 and 14.

In operation 1213, the terminal 110 determines the termination of the decoding event. The terminal 110 determines the termination of the decoding event by determining the expiration of the timer. Alternatively, when a condition defined for terminating the event is satisfied, the terminal 110 may determine the termination of the decoding event. Accordingly, the terminal 110 may not decode control information although beacon signals transmitted from the node 2 120-2 and the node 3 120-3 are detected. However, when a decoding event occurs again, the terminal 110 may decode control information transmitted from a neighbor cell during a duration indicated by the timer.

According to the embodiments illustrated in FIG. 12, the control information of neighbor cells are decoded during the decoding gap allocated by request of the terminal 110. The decoding gap may be allocated as described below with reference to FIG. 13.

Figure 13:
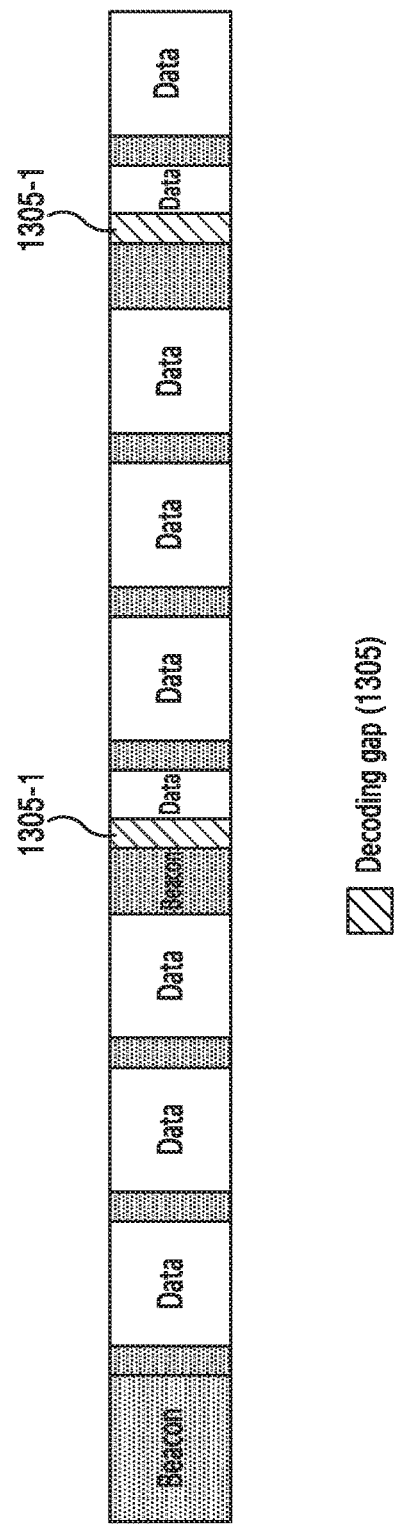
FIG. 13 illustrates an example of a distribution of header decoding gaps in a wireless communication system according to an embodiment of the present disclosure.

FIG. 13 illustrates an example of a distribution of header decoding gaps in a wireless communication system according to an embodiment of the present disclosure.

Referring to FIG. 13, a decoding gap 1305 indicates a time gap in which a serving cell does not transmit data to the terminal 110 so that the terminal 110 decodes the control information of a neighbor cell. As illustrated in FIG. 13, the decoding gap 1305-1 may include a predetermined length of a resource after a resource that transfers a beacon signal. According to another embodiment of the present disclosure, the decoding gap 1305 may include a resource that is a predetermined-distance distant from the resource that transfers a beacon signal. According to another embodiment of the present disclosure, the decoding gap 1305 may be allocated independently from the period of a beacon signal.

According to the embodiment of FIG. 12, the control information of neighbor cells may be decoded during a duration from the occurrence of an event to the termination of the event. Therefore, the decoding gap 1305 may be maintained during the duration of FIG. 14.

Figure 14:
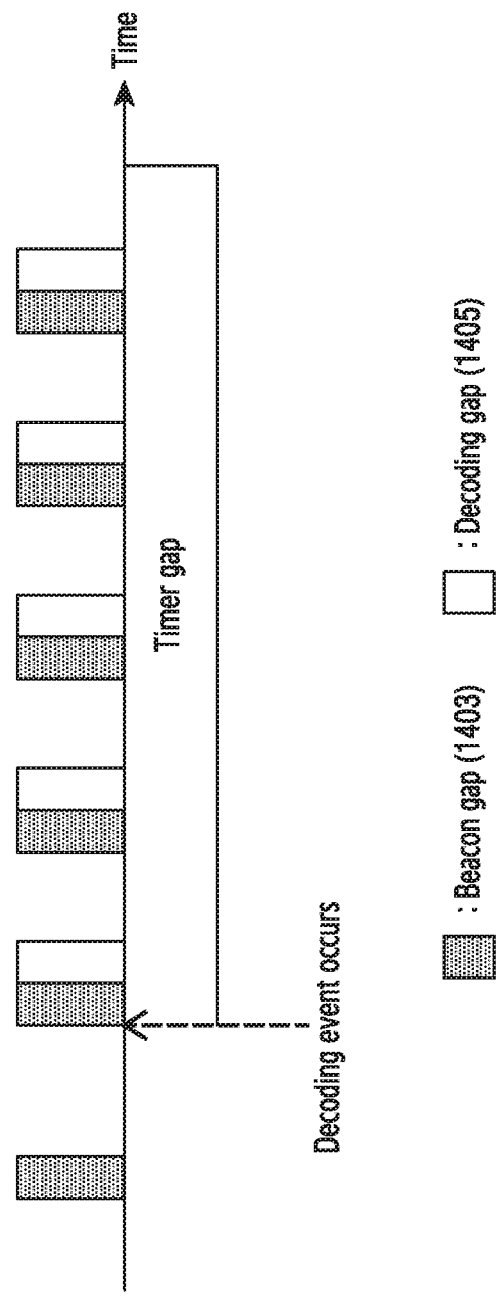
FIG. 14 illustrates an example of a duration where a header decoding gap is maintained in a wireless communication system according to an embodiment of the present disclosure.

FIG. 14 illustrates an example of a duration where a header decoding gap is maintained in a wireless communication system according to an embodiment of the present disclosure.

Referring to FIG. 14, a beacon gap 1403 and a decoding gap 1405 are repeatedly allocated, and the decoding gap 1405 may be allocated within a timer gap.

As described above, the decoding gap for decoding the control information of neighbor cells may be allocated immediately after a beacon gap or in a location that is a predetermined interval distant from the beacon gap, or may be independently allocated irrespective of the beacon gap. The decoding gap may be allocated in various locations when a terminal and a serving cell are aware of the location. In this instance, the detailed location of the decoding gap may be implicitly or explicitly determined.

For example, the decoding gap may be defined in advance. In this instance, a terminal and an access node may understand that the decoding gap is allocated a predetermined period of time (e.g., several μs or several ms) after a beam feedback slot allocated to the terminal. In this instance, the predetermined period of time may be reported through system information (e.g., system information block) or the like.

As another example, the terminal may request a decoding gap from an access node. When the terminal transmits a request for the decoding gap, the terminal may determine the location of the decoding gap and may transmit the request. Accordingly, the access node may allocate the decoding gap based on the request of the terminal. In this instance, additionally, a message indicating that the request of the terminal is permitted may be transmitted.

In the above described embodiments, the decoding event may be an event defined separately for an operation of decoding control information, or may be an event defined for another purpose. A handover event may be used as the event defined for another purpose. In this instance, decoding the control information of neighbor cells may be initiated by the occurrence of the handover event. However, the handover event is defined for handover, and thus, the handover event may not provide a sufficient amount of time for decoding control information. When the sufficient amount of time is not provided for decoding control information, it is difficult to secure a result with high reliability under the situation in which a synchronization sequence collision frequently occurs. Therefore, when the handover event is used as an event for decoding the control information of neighbor cells, an event that instructs the initiation of decoding may be defined separately. Hereinafter, for ease of description, a separate event instructing the initiation of decoding may be referred to as a 'decoding initiation event'.

Figure 15:
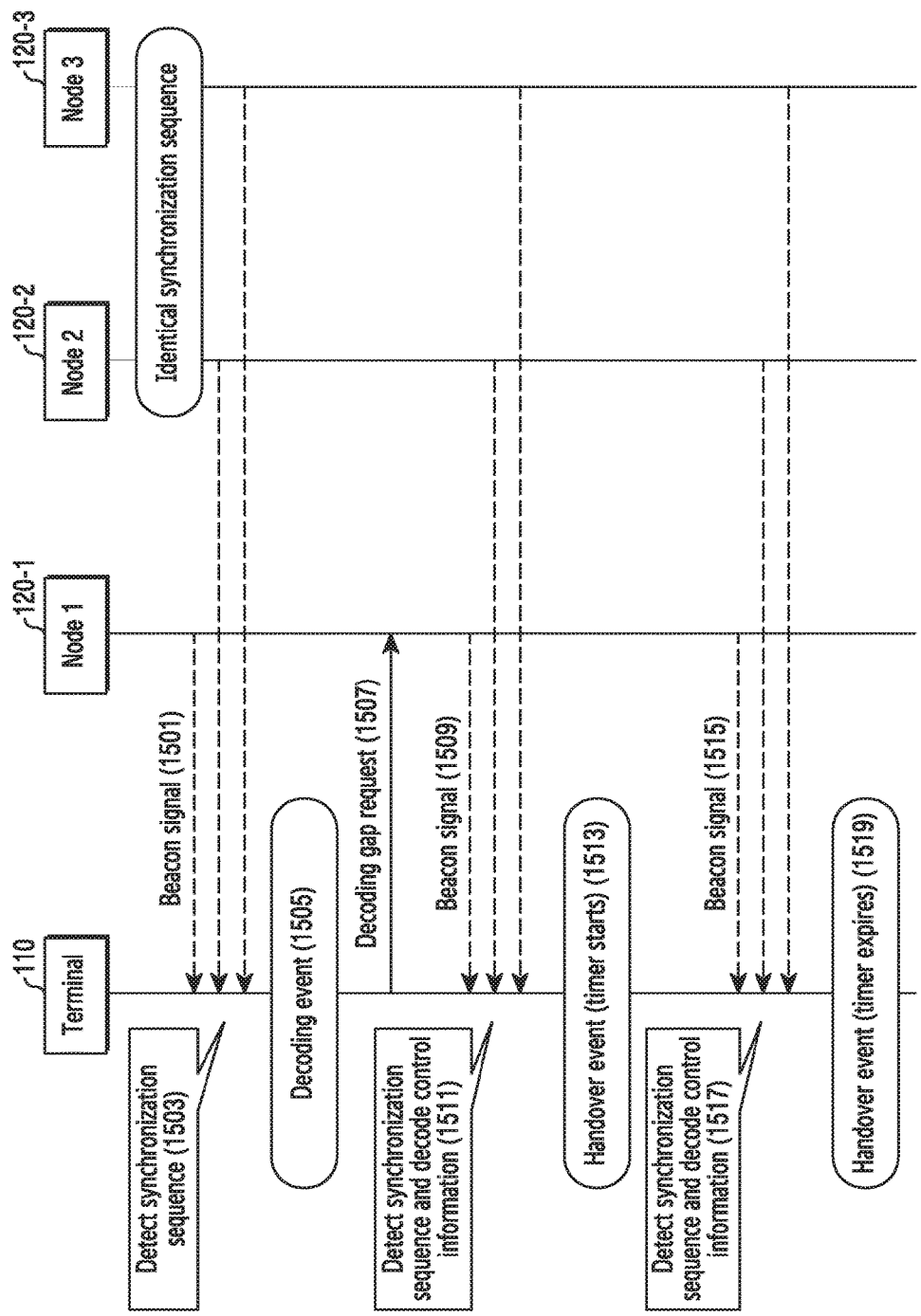
FIG. 15 illustrates a procedure of multiple events-based control information decoding in a wireless communication system according to an embodiment of the present disclosure.

FIG. 15 illustrates a procedure of multiple events-based control information decoding in a wireless communication system according to an embodiment of the present disclosure. FIG. 15 illustrates a decoding procedure performed during a gap allocated by the occurrence of multiple events. FIG. 15 illustrates the case in which decoding the control information of a neighbor cell is restricted based on the occurrence of multiple events.

Referring to FIG. 15, the terminal 110 is connected to a node 1 120-1. A node 2 120-2 and a node 3 120-3 are neighbor cells, and may use an identical synchronization sequence. The terminal 110 may be located in a location where signals from the node 2 120-2 and the node 3 120-3 may be detected.

In operation 1501, each of the node 1 120-1, the node 2 120-2, and the node 3 120-3 transmits a beacon signal. The beacon signal is a signal for informing of the existence of a corresponding node. The beacon signal includes a synchronization sequence and identification information, which are allocated to a corresponding node. The beacon signal may be transmitted periodically.

In operation 1503, the terminal 110 may detect synchronization sequences included in beacon signals, which are transmitted from the node 1 120-1, the node 2 120-2, and the node 3 120-3, respectively. The terminal 110 may detect at least one synchronization sequence through a correlation operation. The synchronization sequence of the node 2 120-2 and the node 3 120-3 have an identical synchronization sequence, and thus, the terminal 110 may not be capable of distinguishing the node 2 120-2 and the node 3 120-3. In this instance, the terminal 110 may measure a reception signal strength using a synchronization sequence. The reception signal strength may be measured for each synchronization sequence. In the case of FIG. 15, the reception signal strength associated with a synchronization sequence used by the node 1 120-1, and the reception signal strength associated with a synchronization sequence used by the node 2 120-2 and the node 3 120-3 may be measured.

In operation 1505, the terminal 110 determines the occurrence of a decoding initiation event. The event may be defined by the reception signal strength associated with a serving cell and the reception signal strength associated with a neighbor cell. Particularly, the event may be defined as a situation in which the reception signal strength associated with a neighbor cell is greater than the sum of the reception signal strength associated with the serving cell and a predetermined first offset. The decoding initiation event is an event that is defined separately for an operation of decoding control information.

In operation 1507, the terminal 110 transmits a request for a decoding gap for decoding control information to the node 1 120-1, which is the serving cell. Accordingly, the node 1 120-1 allocates, to the terminal 110, a decoding gap for decoding the control information of neighbor cells. Detailed resources for the decoding gap is defined in advance, or may be determined through the previous negotiation or the negotiation performed together with the request. Although not illustrated in FIG. 15, the node 1 120-1 may transmit ACK in response to the request.

In operation 1509, each of the node 1 120-1, the node 2 120-2, and the node 3 120-3 transmits a beacon signal. After operation 1501, as a single period elapses, each of the node 1 120-1, the node 2 120-2, and the node 3 120-3 may transmit a beacon signal again. The beacon signal includes a synchronization sequence and identification information, which are allocated to a corresponding node.

In operation 1511, the terminal 110 may detect synchronization sequences included in beacon signals which are transmitted from the node 1 120-1, the node 2 120-2, and the node 3 120-3, respectively. In addition, the terminal 110 decodes control information included in beacon signals. In other words, the terminal 110 decodes control information included in a beacon signal, and determines identification information. The identification information includes a cell identifier. In this instance, the terminal 110 may use a means of decoding (e.g., the control information decoding unit 614) to decode the identification information of neighbor cells during the decoding gap allocated by request. The decoding gap may include a single contiguous resource or a plurality of resources allocated periodically.

In operation 1513, the terminal 110 determines the occurrence of a handover event. The terminal 110 may start a timer for calculating a duration where decoding is maintained. The timer may be referred to as 'time to trigger (TTT)'. The handover event may be defined by the reception signal strength associated with a serving cell and the reception signal strength associated with a neighbor cell. Particularly, the event may be defined as a situation in which the reception signal strength associated with a neighbor cell is greater than the sum of the reception signal strength associated with the serving cell and a predetermined second offset. The second offset may be defined to be greater than the first offset.

In operation 1515, each of the node 1 120-1, the node 2 120-2, and the node 3 120-3 transmits a beacon signal. After operation 1501, as a single period elapses, each of the node 1 120-1, the node 2 120-2, and the node 3 120-3 may transmit a beacon signal, again. The beacon signal includes a synchronization sequence and identification information, which are allocated to a corresponding node.

In operation 1517, the terminal 110 may detect synchronization sequences included in beacon signals which are transmitted from the node 1 120-1, the node 2 120-2, and the node 3 120-3, respectively. In addition, the terminal 110 decodes control information included in beacon signals. In other words, the terminal 110 decodes control information included in a beacon signal and determines identification information. The identification information includes a cell identifier. In this instance, the terminal 110 may use a means of decoding (e.g., the control information decoding unit 614) to decode the identification information of neighbor cells during the decoding gap allocated by request. The decoding gap may include a single contiguous resource or a plurality of resources allocated periodically.

In operation 1519, the terminal 110 determines the termination of the handover event. The terminal 110 determines the termination of the handover event by determining the expiration of the timer (e.g., TTT). Alternatively, when a condition defined for terminating the event is satisfied, the terminal 110 may determine the termination of the handover event. Accordingly, the terminal 110 may not decode control information although beacon signals transmitted from the node 2 120-2 and the node 3 120-3 are detected. However, when the decoding initiation event occurs again, the terminal 110 may decode the control information transmitted from a neighbor cell.

According to the embodiment illustrated in FIG. 15, decoding the control information of neighbor cells begin as a decoding initiation event separately occurs before the occurrence of the handover event. Accordingly, the decoding gap may be maintained in the duration of FIG. 16.

Figure 16:
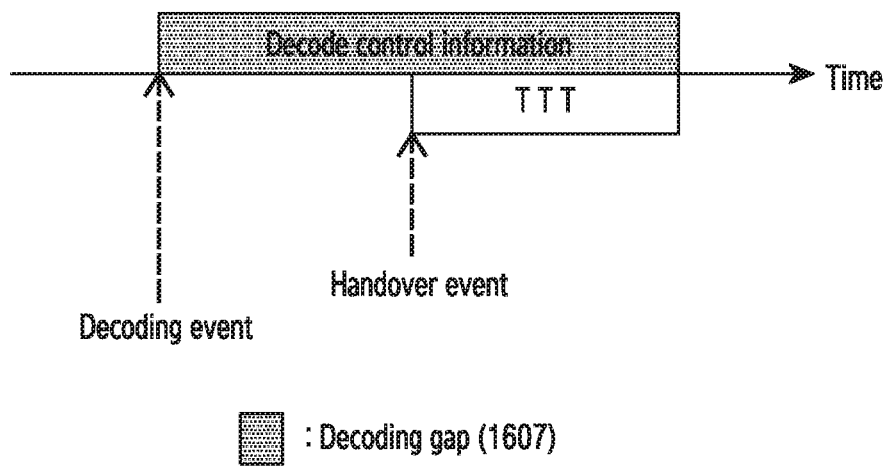
FIG. 16 illustrates a comparison between a handover timer and a duration for decoding a header in a wireless communication system according to an embodiment of the present disclosure.

FIG. 16 illustrates a comparison between a handover timer and a duration for decoding a header in a wireless communication system according to an embodiment of the present disclosure.

Referring to FIG. 16, a decoding gap 1607 starts before a timer gap, and terminates when the timer gap ends.

According to the above described embodiments, decoding control information of neighbor cells have been described from the perspective of the relationship between a terminal and access nodes of the same type. However, various embodiments of the present disclosure may be performed in an environment where different types of access nodes coexist. Different types of access nodes may indicate access nodes based on different standards, access nodes used for different purposes, or access nodes having different characteristics. For example, a system configuration as shown in FIG. 17 may be considered.

Figure 17:
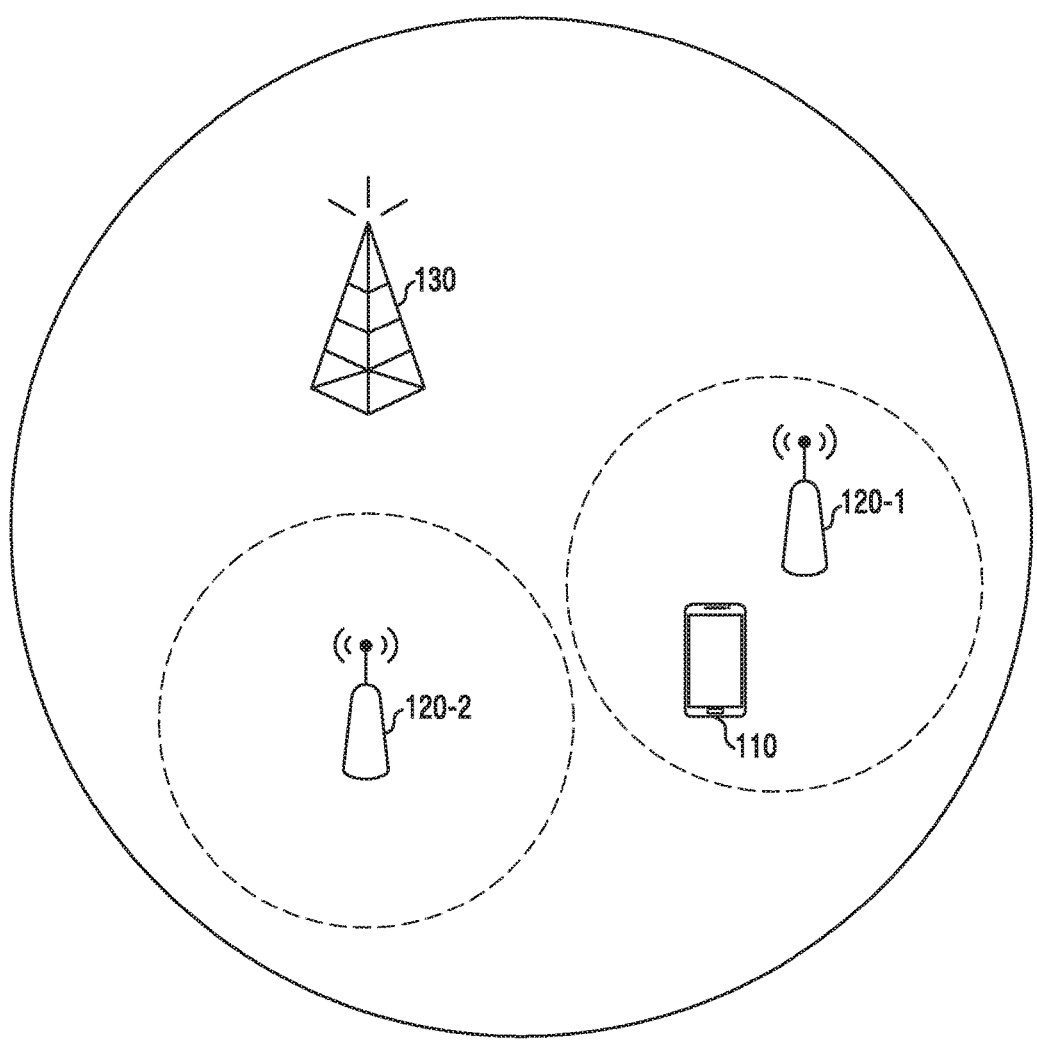
FIG. 17 illustrates another schematic configuration of a wireless communication system according to an embodiment of the present disclosure.

FIG. 17 illustrates another schematic configuration of a wireless communication system according to an embodiment of the present disclosure.

Referring to FIG. 17, although FIG. 17 illustrates two first-type access nodes, such as the node 120-1 and the node 120-2, and a single second-type access node 130, there are many first-type access nodes and second-type access nodes.

Referring to FIG. 17, the second-type access node 130 may have a coverage that is larger than the first-type access nodes 120-1 and 120-2. Accordingly, a hierarchical cell structure may be formed. The terminal 110 may have a multi-connection with the second-type access node 130 and at least one of the first-type access nodes (i.e., the access nodes 120-1 and 120-2) simultaneously. For example, the second-type access node 130 may be a BS for cellular communication. In this instance, the first-type access nodes 120-1 and 120-2 may be an AP, a small BS, or a femto BS. Hereinafter, for ease of description, the second-type access node 130 may be referred to as a 'BS'.

Figure 18:
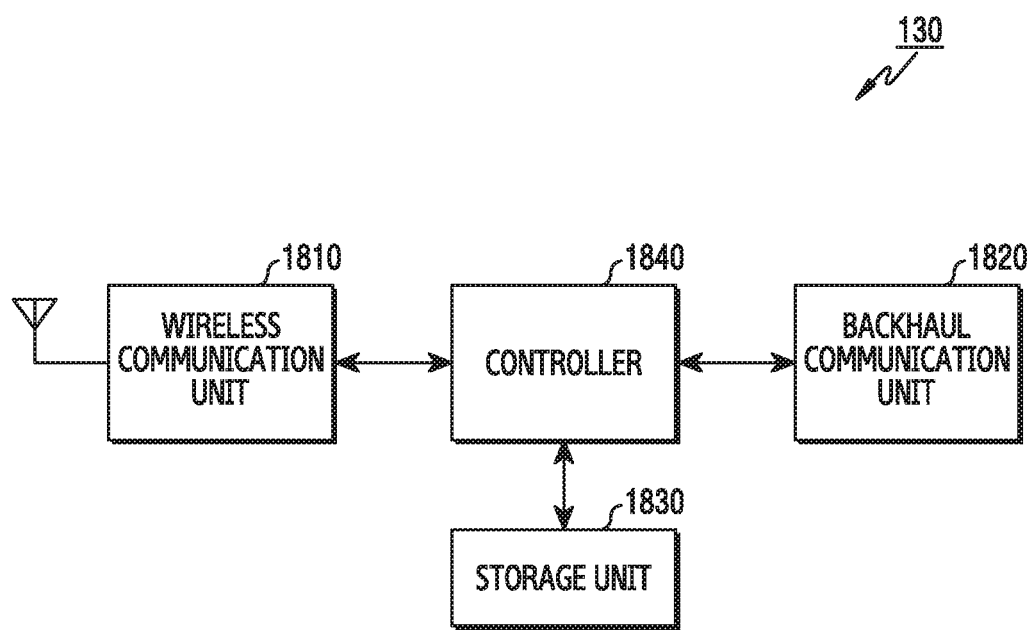
FIG. 18 is a block diagram of a base station (BS) in a wireless communication system according to an embodiment of the present disclosure.

FIG. 18 is a block diagram of a BS in a wireless communication system according to an embodiment of the present disclosure.

Referring to FIG. 18, the BS includes a wireless communication unit 1810, a backhaul communication unit 1820, a storage unit 1830, and a controller 1840.

The wireless communication unit 1810 executes functions for transmitting and receiving signals through a wireless channel. For example, the wireless communication unit 1810 executes a function of conversion between a baseband signal and a bit stream based on a physical layer standard of a system. When data is transmitted, the wireless communication unit 1810 encodes and modulates a transmission bit stream, so as to generate complex symbols. Also, when data is received, the wireless communication unit 1810 decodes and demodulates a baseband signal, so as to restore a reception bit stream. The wireless communication unit 1810 up-converts a baseband signal into an RF band signal and transmits the RF band signal through an antenna, and down-converts an RF band signal received through the antenna into a baseband signal. The wireless communication unit 1810 may include a transmission filter, a reception filter, an amplifier, a mixer, an oscillator, a DAC, an ADC, and the like.

The wireless communication unit 1810 may include a plurality of RF chains. In addition, the wireless communication unit 1810 may perform beamforming. To execute beamforming, the wireless communication unit 1810 may adjust the phase and the size of each signal that is transmitted or received through a plurality of antennas or antenna elements.

The wireless communication unit 1810 may transmit and receive a signal as described above. Accordingly, the wireless communication unit 1810 may also be referred to as a transmitting unit, a receiving unit, or a transceiving unit. The transmission and reception performed through a wireless channel, which is described in the following descriptions, may be used as a meaning that includes that the above described processing is performed by the communication unit 1810.

The backhaul communication unit 1820 may provide an interface for performing the communication with other nodes in a network. The backhaul communication unit 1820 may convert, into a physical signal, a bit stream transmitted from the BS to another node (e.g., another access node, another BS, a core network, and the like), and may convert a physical signal received from the other node into a bit stream.

The storage unit 1830 may store data, such as a basic program, an application program, configuration information, or the like, used for operating the BS. The storage unit 1830 may be configured as a volatile memory, a non-volatile memory, or a combination of a volatile memory and a non-volatile memory. In addition, the storage unit 1830 provides data stored therein in response to a request from the controller 1840.

The controller 1840 may control the general operations of the BS. For example, the controller 1840 may transmit and receive signals through the wireless communication unit 1810 or the backhaul communication unit 1820. In addition, the controller 1840 may record and read data in the storage unit 1830. To this end, the controller 1840 may include at least one processor. According to embodiments of the present disclosure, the controller 1840 may control the handover procedure of a terminal, and may broadcast control information associated with a sequence collision reported by the terminal. For example, the controller 1840 may control the BS to perform the procedures illustrated in FIGS. 19 to 21, FIG. 23, FIG. 24, FIG. 26, and FIG. 27.

Figure 19:
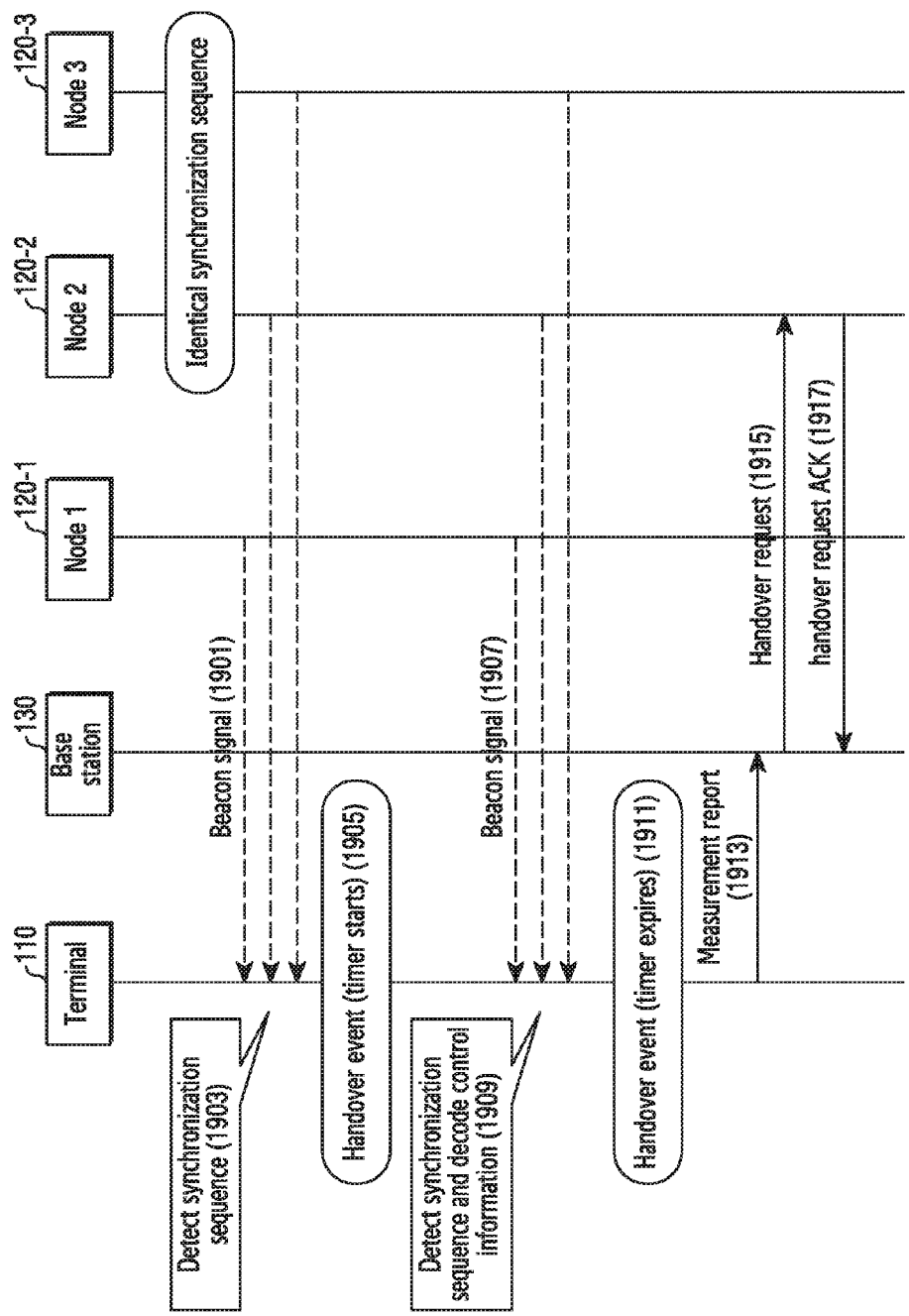
FIG. 19 illustrates a procedure of event-based control information decoding that includes the support of a BS in a wireless communication system according to an embodiment of the present disclosure.

FIG. 19 illustrates a procedure of event-based control information decoding that includes the support of a BS in a wireless communication system according to an embodiment of the present disclosure. FIG. 19 illustrates a procedure that initiates decoding the control information of a neighbor cell based on the occurrence of a handover event. FIG. 19 illustrates the case in which decoding the control information of a neighbor cell is restricted based on the occurrence of a handover event.

Referring to FIG. 19, the terminal 110 is connected to the node 1 120-1. The node 2 120-2 and the node 3 120-3 are neighbor cells, and may use an identical synchronization sequence. The terminal 110 may be located in a location where signals from the node 2 120-2 and the node 3 120-3 may be detected.

In operation 1901, each of the node 1 120-1, the node 2 120-2, and the node 3 120-3 transmits a beacon signal. The beacon signal is a signal for informing of the existence of a corresponding node. The beacon signal includes a synchronization sequence and identification information, which are allocated to a corresponding node. The beacon signal may be transmitted periodically.

In operation 1903, the terminal 110 may detect synchronization sequences included in beacon signals which are transmitted from the node 1 120-1, the node 2 120-2, and the node 3 120-3, respectively. The terminal 110 may detect at least one synchronization sequence through a correlation operation. The node 2 120-2 and the node 3 120-3 have an identical synchronization sequence, and thus, the terminal 110 may not distinguish the node 2 120-2 and the node 3 120-3. In this instance, the terminal 110 may measure a reception signal strength using a synchronization sequence. The reception signal strength may be measured for each synchronization sequence. In the case of FIG. 19, the reception signal strength associated with a synchronization sequence used by the node 1 120-1 and the reception signal strength associated with a synchronization sequence used by the node 2 120-2 and the node 3 120-3 may be measured.

In operation 1905, the terminal 110 determines the occurrence of a handover event. The terminal 110 may start a timer for calculating a duration where decoding is maintained. The timer may be referred to as 'TTT'. The handover event may be defined by the reception signal strength associated with a serving cell and the reception signal strength associated with a neighbor cell. Particularly, the event may be defined as a situation in which the reception signal strength associated with a neighbor cell is greater than the sum of the reception signal strength associated with the serving cell and a predetermined offset.

In operation 1907, each of the node 1 120-1, the node 2 120-2, and the node 3 120-3 transmits a beacon signal. After operation 1901, as a single period elapses, each of the node 1 120-1, the node 2 120-2, and the node 3 120-3 may transmit a beacon signal again. The beacon signal includes a synchronization sequence and identification information, which are allocated to a corresponding node.

In operation 1909, the terminal 110 may detect synchronization sequences included in beacon signals which are transmitted from the node 1 120-1, the node 2 120-2, and the node 3 120-3, respectively. In addition, the terminal 110 decodes control information included in beacon signals. The terminal 110 decodes control information included in a beacon signal, and determines identification information. The identification information includes a cell identifier.

In operation 1911, the terminal 110 determines the termination of the handover event. The terminal 110 determines the termination of the handover event by determining the expiration of the timer. Alternatively, when a condition defined for terminating the event is satisfied, the terminal 110 may determine the termination of the handover event. Accordingly, since then the terminal 110 may not decode control information although beacon signals transmitted from the node 2 120-2 and the node 3 120-3 are detected. However, when a decoding event occurs again, the terminal 110 may decode control information transmitted from a neighbor cell during a duration indicated by the timer.

In operation 1913, the terminal 110 transmits a measurement report to the BS 130. The measurement report may include information associated with the node 2 120-2 and the node 3 120-3. The measurement report may include information associated with identification information and reception signal strength of each of the node 2 120-2 and the node 3 120-3. In addition, the measurement report may further include information indicating the reception signal strength of the node 1 120-1, which is the serving cell.

Accordingly, the BS 130 may determine to perform handover of terminal 110 to the node 2 120-2.

In operation 1915, the BS 130 transmits a handover request to the node 2 120-2. The handover request is a message for inquiring of the node 2 120-2 about providing a radio access to the terminal 110. The handover request includes information associated with the terminal 110. For example, the information associated with the terminal 110 may include at least one of identification information of the terminal 110 and a required service level (e.g., a transmission rate, an amount of resources, a type of service, and the like).

In operation 1917, the node 2 120-2 transmits ACK to the BS 130 in response to the handover request. The node 120-2 determines whether providing a radio access to the terminal 110 is possible, and determines that the terminal 110 is acceptable. The node 120-2 may perform admission control, and may transmit a message reporting that handover is possible. The admission control may be performed based on available resources, the number of terminals that access, an amount of resource required by the terminal 110, and the like.

Figure 20:
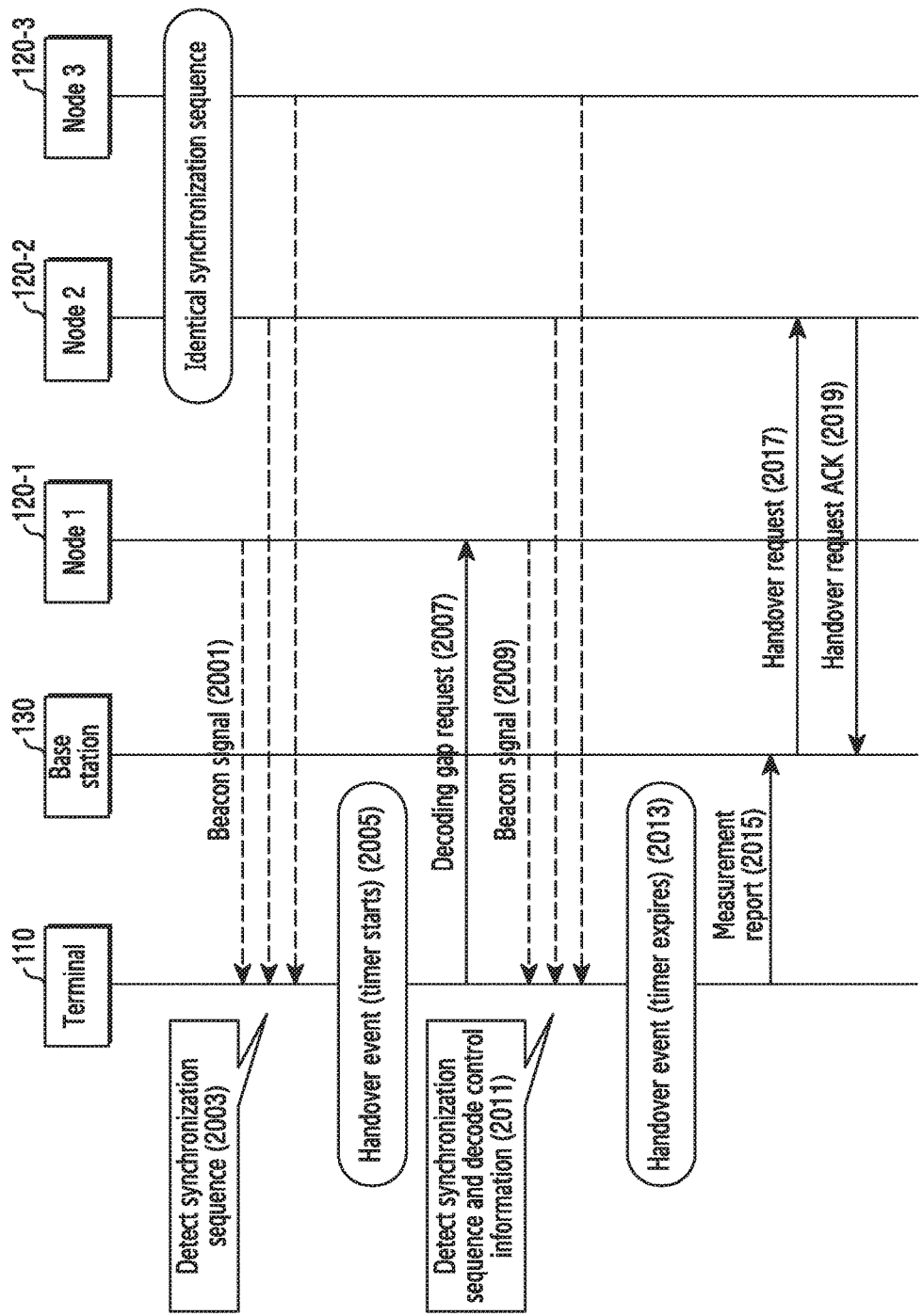
FIG. 20 illustrates a procedure of gap request-based control information decoding that includes the support of a BS in a wireless communication system according to an embodiment of the present disclosure.

FIG. 20 illustrates a procedure of gap request-based control information decoding that includes the support of a BS in a wireless communication system according to an embodiment of the present disclosure. FIG. 20 illustrates a decoding procedure performed during a gap allocated by request. FIG. 20 illustrates the case in which decoding the control information of a neighbor cell is restricted based on the requested gap.

Referring to FIG. 20, the terminal 110 is connected to a node 1 120-1. A node 2 120-2 and a node 3 120-3 are neighbor cells, and may use an identical synchronization sequence. The terminal 110 may be located in a location where signals from the node 2 120-2 and the node 3 120-3 may be detected.

In operation 2001, each of the node 1 120-1, the node 2 120-2, and the node 3 120-3 transmits a beacon signal. The beacon signal is a signal for informing of the existence of a corresponding node. The beacon signal includes a synchronization sequence and identification information, which are allocated to a corresponding node. The beacon signal may be transmitted periodically.

In operation 2003, the terminal 110 detects synchronization sequences included in beacon signals which are transmitted from the node 1 120-1, the node 2 120-2, and the node 3 120-3, respectively. The terminal 110 may detect at least one synchronization sequence through a correlation operation. The synchronization sequence of the node 2 120-2 and the node 3 120-3 have an identical synchronization sequence, and thus, the terminal 110 may not be capable of distinguishing the node 2 120-2 and the node 3 120-3. In this instance, the terminal 110 may measure a reception signal strength using a synchronization sequence. The reception signal strength may be measured for each synchronization sequence. In the case of FIG. 20, the reception signal strength associated with a synchronization sequence used by the node 1 120-1, and the reception signal strength associated with a synchronization sequence used by the node 2 120-2 and the node 3 120-3 may be measured.

In operation 2005, the terminal 110 determines the occurrence of a handover event. The terminal 110 may start a timer for calculating a duration where decoding is maintained. The timer may be referred to as 'TTT'. The handover event may be defined by the reception signal strength associated with a serving cell and the reception signal strength associated with a neighbor cell. Particularly, the event may be defined as a situation in which the reception signal strength associated with a neighbor cell is greater than the sum of the reception signal strength associated with the serving cell and a predetermined offset.

In operation 2007, the terminal 110 transmits a request for a decoding gap for decoding control information, to the node 1 120-1 which is the serving cell. Accordingly, the node 1 120-1 allocates a decoding gap for decoding the control information of neighbor cells to the terminal 110. Detailed resources for the decoding gap is defined in advance, or may be determined through the previous negotiation or the negotiation performed together with the request. Although not illustrated in FIG. 20, the node 1 120-1 may transmit ACK in response to the request.

In operation 2009, each of the node 1 120-1, the node 2 120-2, and the node 3 120-3 transmits a beacon signal. After operation 2001, as a single period elapses, each of the node 1 120-1, the node 2 120-2, and the node 3 120-3 may transmit a beacon signal, again. The beacon signal includes a synchronization sequence and identification information, which are allocated to a corresponding node.

In operation 2011, the terminal 110 detects synchronization sequences included in beacon signals which are transmitted from the node 1 120-1, the node 2 120-2, and the node 3 120-3, respectively. In addition, the terminal 110 decodes control information included in beacon signals. In other words, the terminal 110 decodes control information included in a beacon signal, and determines identification information. The identification information includes a cell identifier. In this instance, the terminal 110 may use a means of decoding (e.g., the control information decoding unit 614) to decode the identification information of neighbor cells during the decoding gap allocated by request. The decoding gap may include a single contiguous resource or a plurality of resources allocated periodically.

In operation 2013, the terminal 110 determines the termination of the handover event. The terminal 110 determines the termination of the handover event by determining the expiration of the timer. Alternatively, when a condition defined for terminating the event is satisfied, the terminal 110 may determine the termination of the handover event. Accordingly, since then the terminal 110 may not decode control information although beacon signals transmitted from the node 2 120-2 and the node 3 120-3 are detected. However, when a decoding event occurs again, the terminal 110 may decode control information transmitted from a neighbor cell during a duration indicated by the timer.

In operation 2015, the terminal 110 transmits a measurement report to the BS 130. The measurement report may include information associated with the node 2 120-2 and the node 3 120-3. Particularly, the measurement report may include information associated with identification information and reception signal strength of each of the node 2 120-2 and the node 3 120-3. In addition, the measurement report may further include information indicating the reception signal strength of the node 1 120-1, which is the serving cell. Accordingly, the BS 130 may determine to control for the handover of terminal 110 to the node 2 120-2.

In operation 2017, the BS 130 transmits a handover request to the node 2 120-2. The handover request is a message for inquiring of the node 2 120-2 about providing the terminal 110 with a radio access. The handover request includes information associated with the terminal 110. For example, the information associated with the terminal 110 may include at least one of identification information of the terminal 110 and a required service level (e.g., a transmission rate, an amount of resources, a type of service, and the like).

In operation 2019, the node 2 120-2 transmits ACK to the BS 130 in response to the handover request. The node 120-2 determines whether providing a radio access to the terminal 110 is possible, and determines that the terminal 110 is acceptable. The node 120-2 may perform admission control, and may transmit a message reporting that handover is possible. The admission control may be performed based on available resources, the number of terminals that access, an amount of resource required by the terminal 110, and the like.

In FIG. 20, the decoding gap for decoding the control information of neighbor cells may be allocated immediately after a beacon gap or in a location that is a predetermined interval distant from the beacon gap, or may be independently allocated irrespective of the beacon gap. The decoding gap may be allocated in various locations when the terminal 110 and the node 1 120-1 which is the serving cell are aware of the location.

For example, the decoding gap may be defined in advance. In this instance, the terminal 110 and the node 1 120-1 may understand that the decoding gap is allocated a predetermined period of time (e.g., several us or several ms) after a beam feedback slot that is allocated to the terminal 110. In this instance, the predetermined period of time may be reported through system information (e.g., system information block) or the like.

As another example, the BS 130 may report the decoding gap to the terminal 110. When the terminal 110 performs handover, the BS 130 may transmit a handover command. In addition, through the handover command, the BS 130 may transfer information associated with a beam feedback slot to be used for handover. The beam feedback slot may be determined by a target cell. In this instance, the access node of the target cell may allocate the decoding gap together, and may transfer the same to the BS 130. Accordingly, the BS 130 may report the location of the decoding gap together with the handover command.

As another example, the terminal 110 may request the decoding gap from the node 1 120-1. When the terminal 110 transmits a request for the decoding gap, the terminal 110 may determine the location of the decoding gap and may transmit the request. Accordingly, the node 1 120-1 may allocate the decoding gap based on the request of the terminal.

Figure 21:
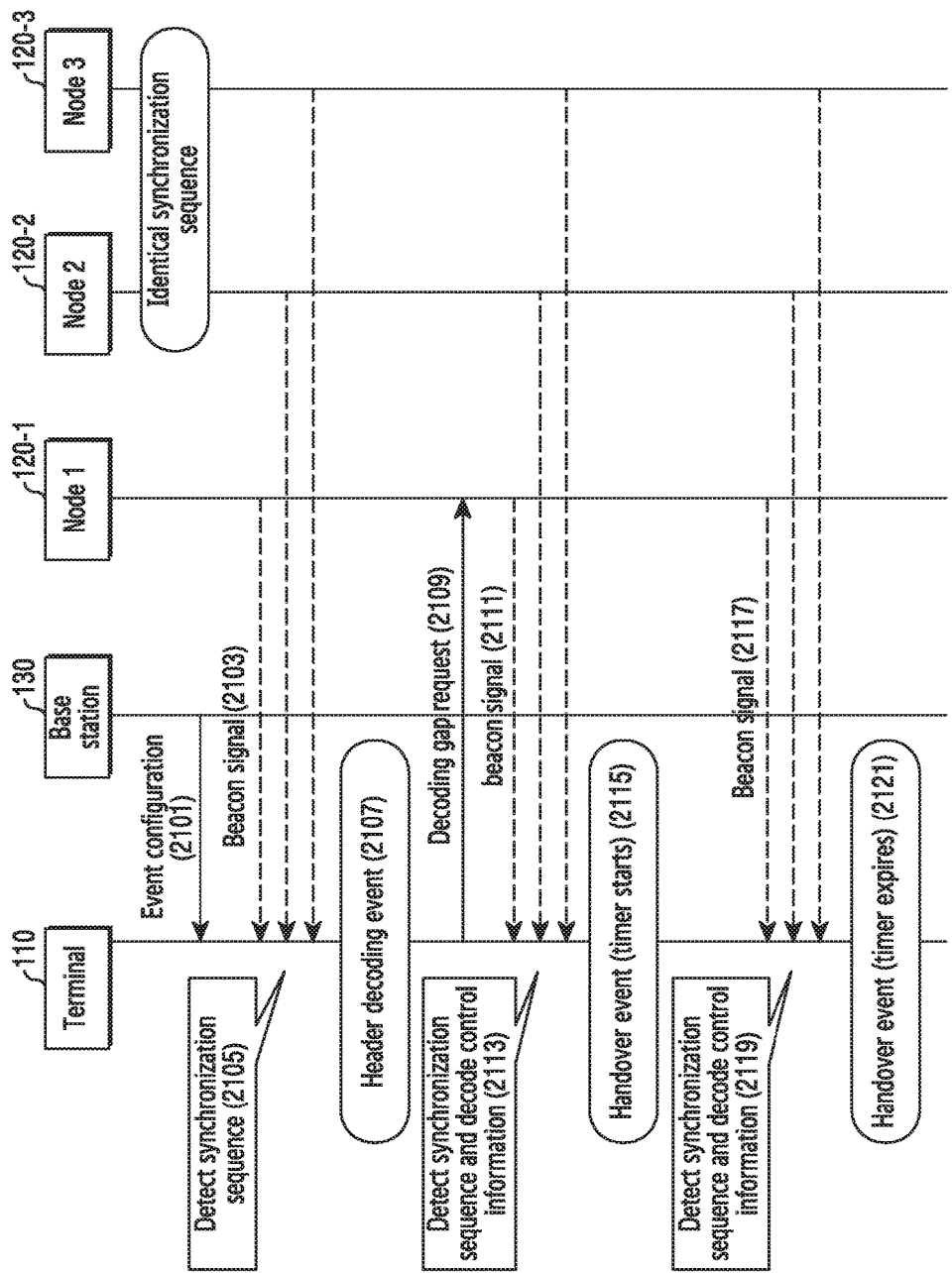
FIG. 21 illustrates a procedure of multiple events-based control information decoding that includes the support of a BS in a wireless communication system according to an embodiment of the present disclosure.

FIG. 21 illustrates a procedure of multiple events-based control information decoding that includes the support of a BS, in a wireless communication system according to an embodiment of the present disclosure. FIG. 21 illustrates a decoding procedure performed during a gap allocated by the occurrence of multiple events. FIG. 21 illustrates the case in which decoding the control information of a neighbor cell is restricted based on the occurrence of multiple events.

Referring to FIG. 21, the terminal 110 is connected to the node 1 120-1. The node 2 120-2 and the node 3 120-3 are neighbor cells, and may use an identical synchronization sequence. The terminal 110 may be located in a location where signals from the node 2 120-2 and the node 3 120-3 may be detected.

In operation 2101, the BS 130 transmits event configuration information to the terminal 110. The event configuration information includes information associated with an event that is associated with the initiation of decoding the control information of neighbor cells, which is defined separately from a handover event. Particularly, the event configuration information may include information (e.g., a parameter value required for determining the occurrence of an event, a condition for determining an event, and the like) associated with a condition of a decoding initiation event.

In operation 2103, each of the node 1 120-1, the node 2 120-2, and the node 3 120-3 transmits a beacon signal. The beacon signal is a signal indicating the existence of a corresponding node. The beacon signal includes a synchronization sequence and identification information, which are allocated to a corresponding node. The beacon signal may be transmitted periodically.

In operation 2105, the terminal 110 detects synchronization sequences included in beacon signals which are transmitted from the node 1 120-1, the node 2 120-2, and the node 3 120-3, respectively. The terminal 110 may detect at least one synchronization sequence through a correlation operation. The node 2 120-2 and the node 3 120-3 have an identical synchronization sequence, and thus, the terminal 110 may not distinguish the node 2 120-2 and the node 3 120-3. In this instance, the terminal 110 may measure a reception signal strength using a synchronization sequence. The reception signal strength may be measured for each synchronization sequence. In the case of FIG. 21, the reception signal strength associated with a synchronization sequence used by the node 1 120-1, and the reception signal strength associated with a synchronization sequence used by the node 2 120-2 and the node 3 120-3 may be measured.

In operation 2107, the terminal 110 determines the occurrence of a decoding initiation event. The event may be defined by the reception signal strength associated with a serving cell and the reception signal strength associated with a neighbor cell. Particularly, the event may be defined as a situation in which the reception signal strength associated with a neighbor cell is greater than the sum of the reception signal strength associated with the serving cell and a predetermined first offset. The decoding initiation event is an event that is defined separately for an operation of decoding control information.

In operation 2109, the terminal 110 transmits a request for a decoding gap for decoding control information to the node 1 120-1, which is the serving cell. Accordingly, the node 1 120-1 allocates a decoding gap for decoding the control information of neighbor cells to the terminal 110. Detailed resources for the decoding gap is defined in advance, or may be determined through the previous negotiation or the negotiation performed together with the request. Although not illustrated in FIG. 21, the node 1 120-1 may transmit ACK in response to the request.

In operation 2111, each of the node 1 120-1, the node 2 120-2, and the node 3 120-3 transmits a beacon signal. After operation 2101, as a single period elapses, each of the node 1 120-1, the node 2 120-2, and the node 3 120-3 may transmit a beacon signal again. The beacon signal includes a synchronization sequence and identification information, which are allocated to a corresponding node.

In operation 2113, the terminal 110 detects synchronization sequences included in beacon signals which are transmitted from the node 1 120, the node 2 120-2, and the node 3 120-3, respectively. In addition, the terminal 110 decodes control information included in beacon signals. In other words, the terminal 110 decodes control information included in a beacon signal, and determines identification information. The identification information includes a cell identifier. In this instance, the terminal 110 may use a means of decoding (e.g., the control information decoding unit 614) to decode the identification information of neighbor cells during the decoding gap allocated by request. The decoding gap may include a single contiguous resource or a plurality of resources allocated periodically.

In operation 2115, the terminal 110 determines the occurrence of a handover event. The terminal 110 may start a timer for calculating a duration where decoding is maintained. The timer may be referred to as 'TTT'. The handover event may be defined by the reception signal strength associated with a serving cell and the reception signal strength associated with a neighbor cell. Particularly, the event may be defined as a situation in which the reception signal strength associated with a neighbor cell is greater than the sum of the reception signal strength associated with the serving cell and a predetermined second offset. The second offset may be defined to be greater than the first offset.

In operation 2117, each of the node 1 120-1, the node 2 120-2, and the node 3 120-3 transmits a beacon signal. After operation 2101, as a single period elapses, each of the node 1 120-1, the node 2 120-2, and the node 3 120-3 may transmit a beacon signal, again. The beacon signal includes a synchronization sequence and identification information, which are allocated to a corresponding node.

In operation 2119, the terminal 110 detects synchronization sequences included in beacon signals which are transmitted from the node 1 120-1, the node 2 120-2, and the node 3 120-3, respectively. In addition, the terminal 110 decodes control information included in beacon signals. In other words, the terminal 110 decodes control information included in a beacon signal, and determines identification information. The identification information includes a cell identifier. In this instance, the terminal 110 may use a means of decoding (e.g., the control information decoding unit 614) to decode the identification information of neighbor cells during the decoding gap allocated by request. The decoding gap may include a single contiguous resource or a plurality of resources allocated periodically.

In operation 2121, the terminal 110 determines the termination of the handover event. The terminal 110 determines the termination of the handover event by determining the expiration of the timer (e.g., TTT). Alternatively, when a condition defined for terminating the event is satisfied, the terminal 110 may determine the termination of the handover event. Accordingly, since then the terminal 110 may not decode control information although beacon signals transmitted from the node 2 120-2 and the node 3 120-3 are detected. However, when the decoding initiation event occurs again, the terminal 110 may decode the control information transmitted from a neighbor cell.

In the above described embodiments of the present disclosure, a terminal determines whether to decode the control information of neighbor cells without outside help. According to another embodiment of the present disclosure, when the terminal detects a synchronization sequence collision, the terminal share information associated with the collision with other terminals through a BS, and may provide help to the operations of other terminals to decode the control information of the neighbor cells. The synchronization sequence collision may be referred to as a 'sequence collision' or a 'preamble collision'. The sequence collision may lead to confusion in identifying cells, and thus, the sequence collision may be referred to as 'identification information confusion'. Sharing the information associated with the collision may be performed as described in FIG. 22.

Figure 22:
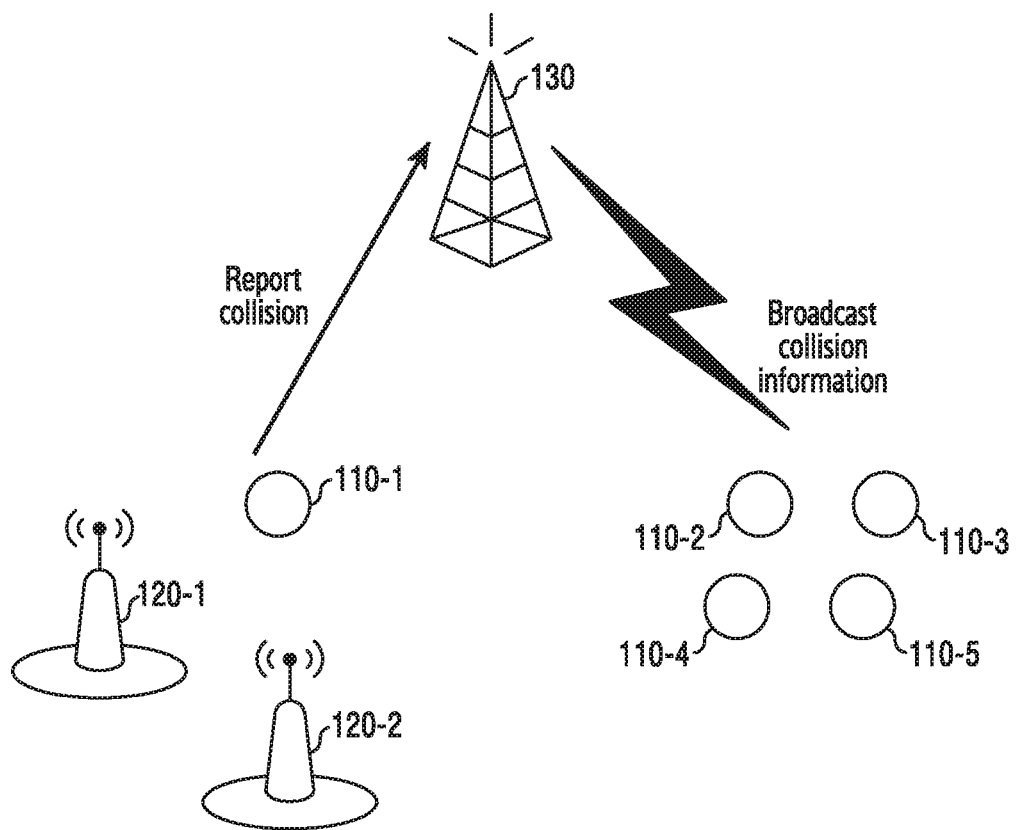
FIG. 22 illustrates sharing information associated with a synchronization sequence collision in a wireless communication system according to an embodiment of the present disclosure.

FIG. 22 illustrates sharing information associated with a synchronization sequence collision in a wireless communication system according to an embodiment of the present disclosure.

Referring to FIG. 22, a terminal 110-1 communicates with the access node 120-1 which is a serving cell. In the case in which the access node 120-2, which is a neighbor cell, uses an identical synchronization sequence, interference may occur when the terminal 110-1 decodes the control information of the access node 120-1. The terminal 110-1 continuously decodes the control information of the access node 120-1, and thus, may determine whether a synchronization sequence collision occurs. For example, although the synchronization sequence allocated to the access node 120-1 is detected, when the result of decoding the control information determines the identification information of an access node (e.g., the access node 120-2) that is different from the identification information of the access node 120-1 or when decoding fails, the terminal 110-1 may determine a synchronization sequence collision.

Referring to FIG. 22, when the collision is determined (or detected), the terminal 110-1 may report the collision to the BS 130. To this end, the terminal 110-1 may report the occurrence of a collision and the synchronization sequence of a serving cell (i.e., information (e.g., a sequence index and the like) associated with a colliding synchronization sequence) and the identification information of a corresponding cell. Accordingly, the BS 130 broadcasts the information associated with the collision, and thus, may provide the information associated with the colliding synchronization sequence to other terminals 110-2 to 110-5 that access the BS 130. The BS 130 collects the information associated with the collision, and may share the colliding synchronization sequence and cell identification information with the terminals 110-2 to 110-5 in the cell (e.g., a macro cell) of the BS 130.

Figure 23:
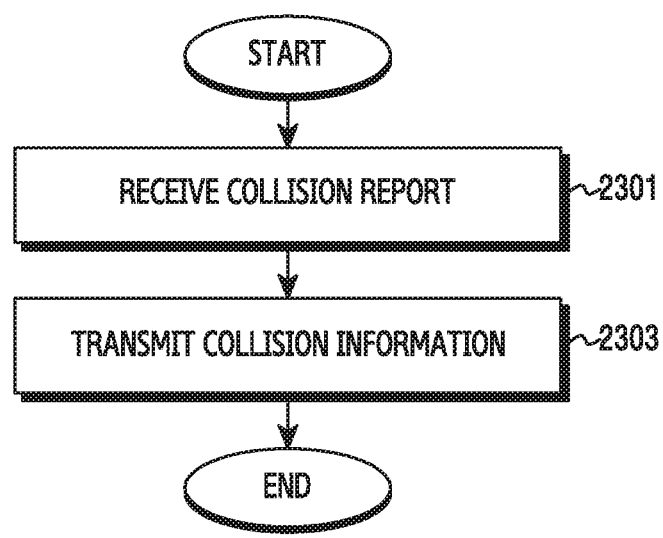
FIG. 23 illustrates an operation procedure of a BS in a wireless communication system according to an embodiment of the present disclosure.

FIG. 23 illustrates an operation procedure of a BS in a wireless communication system according to an embodiment of the present disclosure. FIG. 23 illustrates the operation method of the BS 130.

Referring to FIG. 23, the BS receives a collision report in operation 2301. The collision report includes the information associated with a synchronization sequence collision between access nodes detected by a terminal. The access node may be a node of a type that is different from the BS.

Subsequently, the BS transmits the information associated with the collision in operation 2303. The BS transmits, to at least one other terminal, the information included in the collision report received in operation 2301. The information associated with the collision may include at least one out of: information (e.g., a sequence index) associated with a colliding synchronization sequence and identification information (e.g., a cell identifier) of at least one access node that uses a colliding synchronization sequence.

Figure 24:
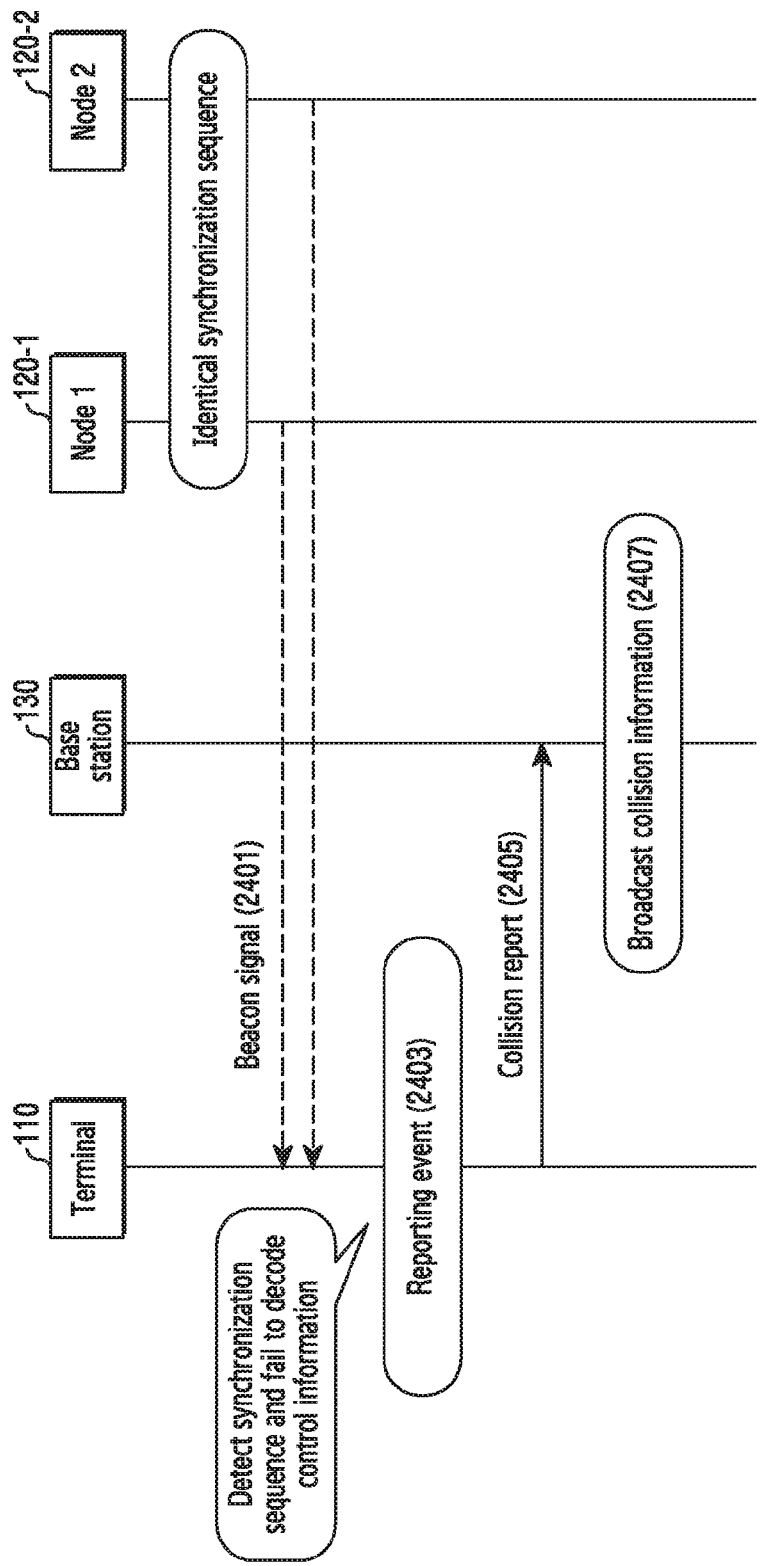
FIG. 24 illustrates a procedure of sharing information associated with a collision in a wireless communication system according to an embodiment of the present disclosure.

FIG. 24 illustrates a procedure of sharing information associated with a collision in a wireless communication system according to an embodiment of the present disclosure. FIG. 24 illustrates the operation method of the terminal 110 and the BS 130 for sharing the information associated with the collision as described in FIG. 22.

Referring to FIG. 24, the terminal 110 is connected to the node 1 120-1. The node 2 120-2, which is a neighbor cell, may use a synchronization sequence that is identical to that of the node 1 120-1. The terminal 110 may be located in a location where a signal from the node 2 120-2 may be detected.

In operation 2401, each of the node 1 120-1 and the node 2 120-2 transmits a beacon signal. The beacon signal is a signal for informing of the existence of a corresponding node. The beacon signal includes a synchronization sequence and identification information, which are allocated to a corresponding node. The beacon signal may be transmitted periodically.

In operation 2403, the terminal 110 determines the occurrence of an event defined for reporting a collision. The terminal 110 determines the occurrence of the collision. The terminal 110 may detect synchronization sequences included in beacon signals which are transmitted from the node 1 120-1 and the node 2 120-2, respectively. The terminal 110 may detect at least one synchronization sequence through a correlation operation. However, the terminal 110 may fail to decode control information included in the beacon signal. Accordingly, the terminal 110 determines that a synchronization sequence collision occurs. Alternatively, unlike FIG. 24, the terminal 110 successfully performs decoding control information, but may determine that the included identification information is the identification information of the node 2 120-2, as opposed to the identification information of the node 1 120-1. In this instance, the terminal determines that a synchronization sequence collision occurs. Hereinafter, for ease of descriptions, an event defined for reporting a collision is referred to as a 'report event'.

In operation 2405, the terminal 110 transmits a collision report to the BS 130. The collision report is a message indicating the occurrence of a collision, which is determined by the terminal 110. The message may include the information associated with a colliding synchronization sequence (e.g., a sequence index and the like) and the identification information of a corresponding cell (e.g., at least one of the identification information of the node 1 120-1 and the identification information of the node 2 120-2).

In operation 2407, the BS 130 broadcasts the information associated with a collision. The BS 130 transmits a message including the information obtained through the collision report to a plurality of terminals. In this instance, the BS 130 may transmit the message through a cellular network. The message may include the information associated with a colliding synchronization sequence (e.g., a sequence index and the like) and the identification information of a corresponding cell (e.g., at least one of the identification information of the node 1 120-1 and the identification information of the node 2 120-2). Through the above operations, terminals other than the terminal 110 may share the information associated with the collision determined by the terminal 110.

As described above, the information associated with the collision, which is transferred to the BS through the collision report, may be shared with another terminal. Accordingly, the other terminal may control an operation of decoding the control information of neighbor cells based on the information associated with the collision. Controlling the decoding operation may be performed as described below with reference to FIG. 25.

Figure 25:
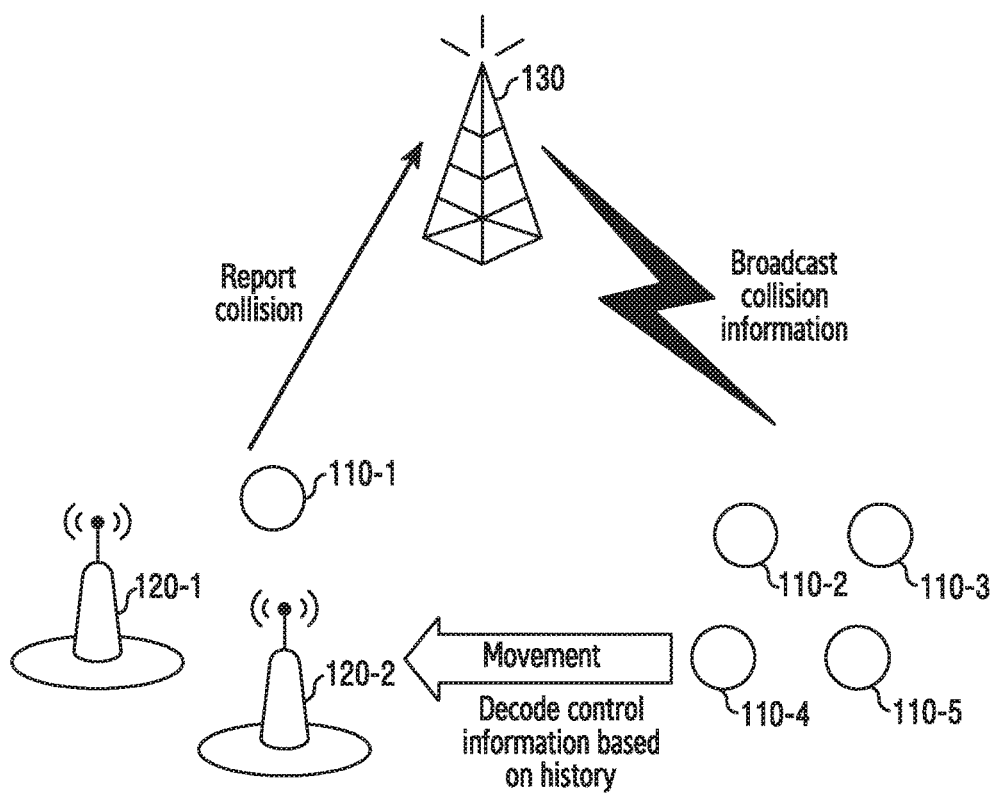
FIG. 25 illustrates sharing and utilizing information associated with a synchronization sequence collision in a wireless communication system according to an embodiment of the present disclosure.

FIG. 25 illustrates sharing and utilizing information associated with a synchronization sequence collision in a wireless communication system according to an embodiment of the present disclosure.

Referring to FIG. 25, the terminal 110-1 communicates with the access node 120-1, which is a serving cell. In this instance, the access node 120-2, which is a neighbor cell, may use an identical synchronization sequence. When the occurrence of the collision is determined, the terminal 110-1 may report the collision to the BS 130. To this end, the terminal 110-1 may report the occurrence of the collision and the synchronization sequence of a serving cell (that is, information (e.g., a sequence index and the like) associated with a colliding synchronization sequence) and the identification information of a corresponding cell. Accordingly, the BS 130 broadcasts the information associated with the collision, and thus, may provide the information associated with the colliding synchronization sequence to other terminals 110-2 to 110-5 that access the BS 130. Accordingly, other terminals 110-2 to 110-5 may store information associated with the colliding synchronization sequence (i.e., the history of the collision), and may decode the control information based on the history. For example, the other terminals 110-2 to 110-5 may determine the number of times that decoding control information to be performed based on whether a synchronization sequence collision occurred in the past.

Figure 26:
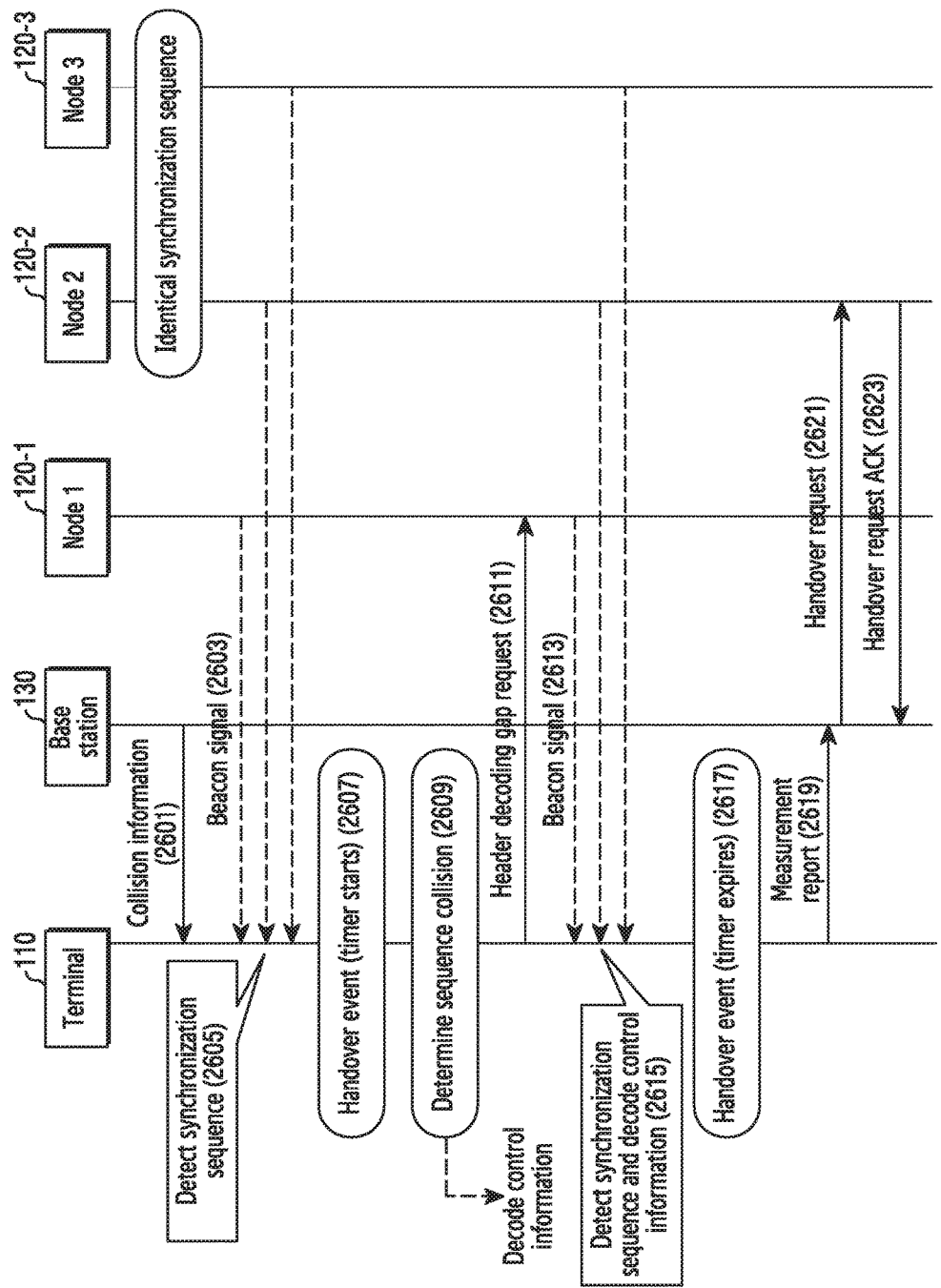
FIG. 26 illustrates a procedure of collision associated information-based control information decoding in a wireless communication system according to an embodiment of the present disclosure.

FIG. 26 illustrates a procedure of collision associated information-based control information decoding in a wireless communication system according to an embodiment of the present disclosure. FIG. 26 illustrates the operation method of the terminal 110 and the BS 130 for decoding control information using the shared collision associated information as described in FIG. 25. The terminal 110 of FIG. 26 corresponds to one of the other terminals 110-2 to 110-5 of FIG. 25.

Referring to FIG. 26, the terminal 110 is connected to the node 1 120-1. The node 2 120-2 and the node 3 120-3 are neighbor cells, and may use an identical synchronization sequence. The terminal 110 may be located in a location where signals from the node 2 120-2 and the node 3 120-3 may be detected.

In operation 2601, the BS 130 transmits the information associated with the collision to the terminal 110. The BS 130 transmits, to the terminal 110, a message including the information obtained through a collision report. In this instance, the BS 130 may transmit the message through a cellular network. The message may include the information associated with a colliding synchronization sequence (e.g., a sequence index and the like) and identification information of a corresponding cell. Through the above operations, the terminal 110 may share the information associated with the collision determined by another terminal.

In operation 2603, each of the node 1 120-1, the node 2 120-2, and the node 3 120-3 transmit a beacon signal. The beacon signal is a signal indicating the existence of a corresponding node. The beacon signal includes a synchronization sequence and identification information, which is allocated to a corresponding node. The beacon signal may be transmitted periodically.

In operation 2605, the terminal 110 detects synchronization sequences included in beacon signals which are transmitted from the node 1 120-1, the node 2 120-2, and the node 3 120-3, respectively. The terminal 110 may detect at least one synchronization sequence through a correlation operation. The node 2 120-2 and the node 3 120-3 have an identical synchronization sequence, and thus, the terminal 110 may not be capable of distinguishing the node 2 120-2 and the node 3 120-3. In this instance, the terminal 110 may measure a reception signal strength using a synchronization sequence. The reception signal strength may be measured for each synchronization sequence. In the case of FIG. 21, the reception signal strength associated with a synchronization sequence used by the node 1 120-1, and the reception signal strength associated with a synchronization sequence used by the node 2 120-2 and the node 3 120-3 may be measured.

In operation 2607, the terminal 110 determines the occurrence of a handover event. The terminal 110 may start a timer for calculating a duration where decoding is maintained. The timer may be referred to as 'TTT'. The handover event may be defined by the reception signal strength associated with a serving cell and the reception signal strength associated with a neighbor cell. Particularly, the event may be defined as a situation in which the reception signal strength associated with a neighbor cell is greater than the sum of the reception signal strength associated with the serving cell and a predetermined offset.

In operation 2609, the terminal 110 determines the collision of a sequence. The terminal 110 compares identification information included in the received signal of a neighbor cell with identification information included in a collision history. Based on the occurrence of a handover event, the terminal 110 decodes the control information of neighbor cells, and determines whether identification information included in the control information is included in the collision information received in operation 2601. FIG. 26 assumes the situation in which identification information included in control information is included in collision information.

In operation 2611, the terminal 110 transmits a request for a decoding gap for decoding control information to the node 1 120-1 which is a serving cell. The terminal 110 determines to maintain decoding the control information of neighbor cells through operation 2609, and performs an operation for maintaining decoding of the control information of the neighbor cells. Accordingly, the node 1 120-1 allocates, to the terminal 110, a decoding gap for decoding the control information of neighbor cells. Detailed resources for the decoding gap may be defined in advance, or may be determined through the previous negotiation or the negotiation performed together with the request. Although not illustrated in FIG. 20, the node 1 120-1 may transmit ACK in response to the request. According to another embodiment of the present disclosure, operation 2611 may be performed before operation 2609.

In operation 2613, each of the node 1 120-1, the node 2 120-2, and the node 3 120-3 transmit a beacon signal. After operation 2603, as a single period elapses, each of the node 1 120-1, the node 2 120-2, and the node 3 120-3 may transmit a beacon signal again. The beacon signal includes a synchronization sequence and identification information, which are allocated to a corresponding node.

In operation 2615, the terminal 110 detects synchronization sequences included in beacon signals which are transmitted from the node 1 120-1, the node 2 120-2, and the node 3 120-3, respectively. In addition, the terminal 110 decodes control information included in beacon signals. The terminal 110 decodes control information included in a beacon signal, and determines identification information. The identification information includes a cell identifier. In this instance, the terminal 110 may use a means of decoding (e.g., the control information decoding unit 614) to decode the identification information of neighbor cells during the decoding gap allocated by request. The decoding gap may include a single contiguous resource or a plurality of resources allocated periodically.

In operation 2617, the terminal 110 determines the termination of the handover event. The terminal 110 determines the termination of the handover event by determining the expiration of the timer. Alternatively, when a condition defined for terminating the event is satisfied, the terminal 110 may determine the termination of the handover event. Accordingly, since then the terminal 110 may not decode control information although beacon signals transmitted from the node 2 120-2 and the node 3 120-3 are detected. However, when a decoding event occurs again, the terminal 110 may decode control information transmitted from a neighbor cell during a duration indicated by the timer.

In operation 2619, the terminal 110 transmits a measurement report to the BS 130. The measurement report may include information associated with the node 2 120-2 and the node 3 120-3. The measurement report may include information associated with the identification information and reception signal strength of each of the node 2 120-2 and the node 3 120-3. In addition, the measurement report may further include information indicating the reception signal strength of the node 1 120-1, which is the serving cell. Accordingly, the BS 130 may determine to perform handover of terminal 110 to the node 2 120-2.

In operation 2621, the BS 130 transmits a handover request to the node 2 120-2. The handover request is a message inquiring of the node 2 120-2 about providing a radio access to the terminal 110. The handover request includes information associated with the terminal 110. For example, the information associated with the terminal 110 may include at least one of identification information of the terminal 110 and a required service level (e.g., a transmission rate, an amount of resources, a type of service, and the like).

In operation 2623, the node 2 120-2 transmits ACK to the BS 130 in response to the handover request. The node 120-2 determines whether providing a radio access to the terminal 110 is possible, and determines that the terminal 110 is acceptable. That is, the node 120-2 may perform admission control, and may transmit a message reporting that handover is possible. The admission control may be performed based on available resources, the number of terminals that access, an amount of resource required by the terminal 110, and the like.

Figure 27:
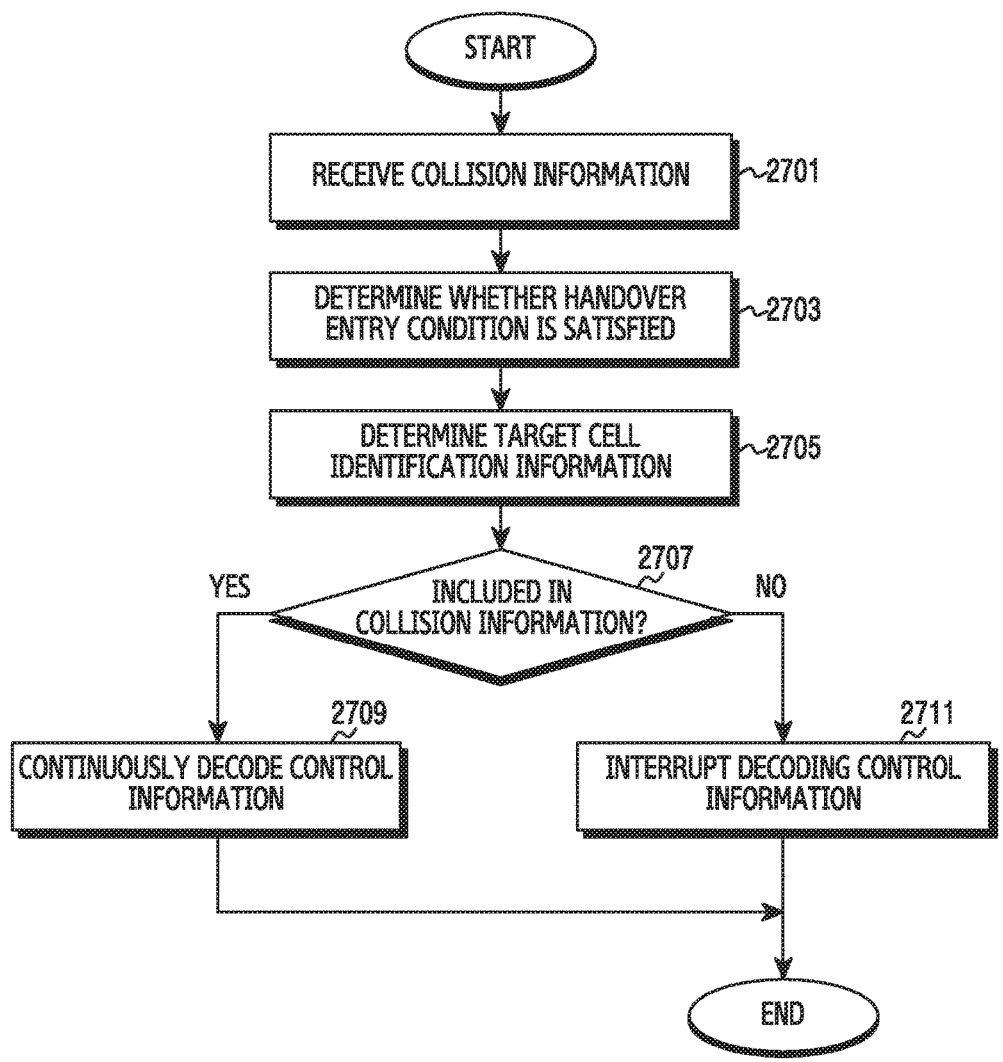
FIG. 27 illustrates an operation procedure of a terminal that utilizes collision associated information in a wireless communication system according to an embodiment of the present disclosure.

FIG. 27 illustrates an operation procedure of a terminal that utilizes collision associated information in a wireless communication system according to an embodiment of the present disclosure. FIG. 27 illustrates an operation method of one of the other terminals 110-2 to 110-5 of FIG. 25.

Referring to FIG. 27, the terminal receives collision information in operation 2701. For example, the terminal receives the collision information from a BS in a cellular network. The collision information is information associated with a sequence collision determined by another terminal, and may include information associated with a colliding synchronization sequence and identification information of at least one corresponding cell. The collision information may be stored in the terminal for use in the future.

At operation 2703, the terminal determines that a handover entry condition is satisfied. The terminal determines the occurrence of a handover event. The terminal detects a handover event based on the detection of a synchronization sequence.

At operation 2705, the terminal determines the identification information of a target cell. When the handover event entry condition is satisfied through the detection of a synchronization sequence, the terminal decodes control information at least once, and determines identification information (e.g., a cell identifier) included in the control information.

At operation 2707, the terminal determines whether the identification information of a target cell is included in the collision information. The terminal may determine whether the identification information of the target cell is the identification information of an access node that generates a collision, which is determined by another terminal. The terminal may determine whether the target cell is one of the access nodes that generates a sequence collision.

When the identification information of the target cell is included in the collision information, the terminal proceeds continuously decodes control information in operation 2709. The collision information indicates the history of the occurrence of a collision. Accordingly, when the signal of a node that uses the identification information included in the collision information is detected, this may indicate that the terminal enters a collision possible region. Subsequently, according to various embodiments of the present disclosure, when a decoding event or a handover event ends, the terminal may suspend decoding control information. When the identification information of the target cell is included in the collision information provided from the BS, the terminal may decode the control information of neighbor cells during a timer duration according to above described various embodiments of the present disclosure.

When the identification information of the target cell is not included in the collision information, the terminal suspends decoding the control information in operation 2711. When the identification information is not included in the collision information, this indicates that a sequence collision caused by the target cell did not occur in the past. Therefore, the probability of the occurrence of a sequence collision in the corresponding region is expected to be low, and thus, the terminal suspends decoding the control information.

As described above, the identification procedure of neighbor cells according to various embodiments of the present disclosure may be connected with a handover procedure. In this instance, the handover between access nodes may be performed as described in the descriptions provided with reference to FIG. 28.

Figure 28:
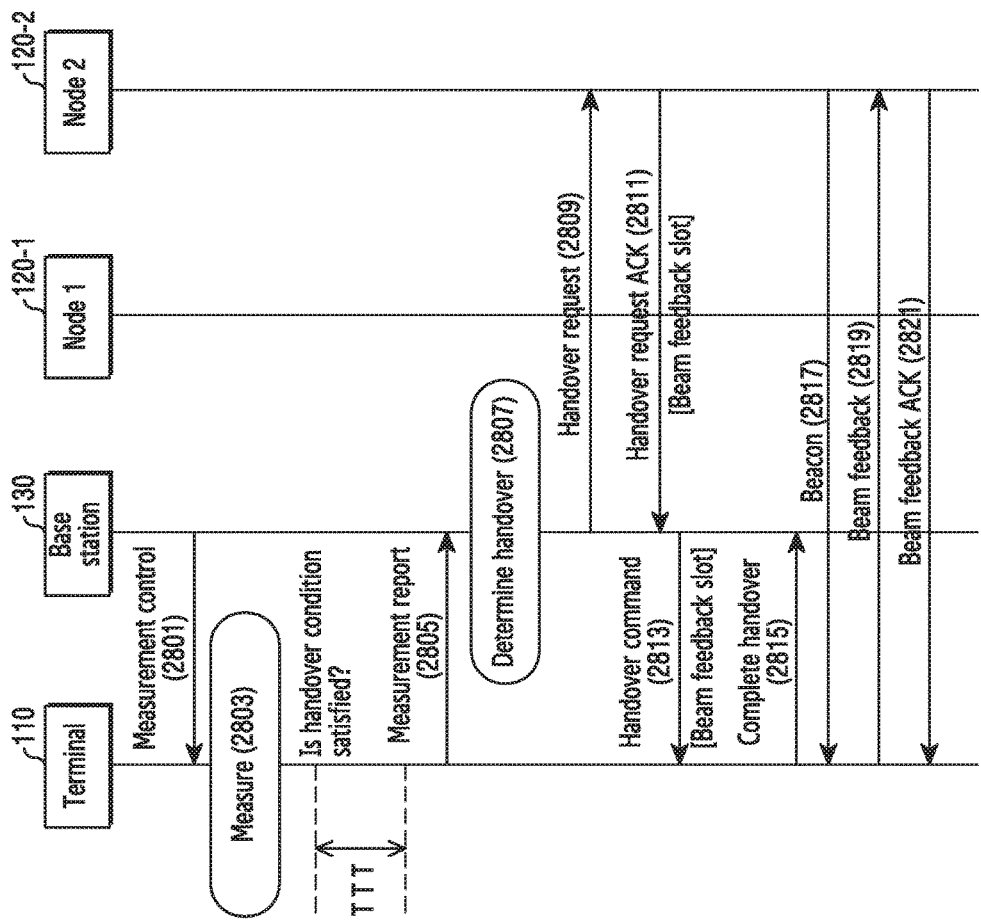
FIG. 28 illustrates a handover procedure in a wireless communication system according to an embodiment of the present disclosure.

FIG. 28 illustrates a handover procedure in a wireless communication system according to an embodiment of the present disclosure. FIG. 28 illustrates the operation methods of the terminal 110, the node 1 120-1, the node 2 120-2, and the BS 130, for the handover of the terminal 110 from the node 1 120-1 to the node 2 120-2.

Referring to FIG. 28, in operation 2801, the BS 130 transmits a measurement control message to the terminal 110. Through the above operation, the BS 130 provides the terminal 110 with information associated with a measurement target and a point in time for the measurement. In this instance, the node 2 120-2 may be designated as the measurement target.

In operation 2803, the terminal 110 performs measurement. Using a signal (e.g., a reference signal, a beacon signal, and the like) transmitted from the node 2 120-2, the reception signal strength associated with the node 2 120-2 may be measured. Accordingly, the terminal 110 determines that a handover condition is satisfied. In the present embodiment, the handover condition is maintained during TTT.

In operation 2805, the terminal 110 transmits a measurement report to the BS 130. The measurement report may include information associated with the reception signal strength measured by the terminal 110. In this instance, information associated with the node 2 120-2 to be selected as a target cell, and the information associated with the node 1 120-1, which is a serving cell, may be included.

In operation 2807, the BS 130 determines to perform handover. The BS 130 may determine to change the serving cell of the terminal 110 from the node 1 120-1 to the node 2 120-2.

In operation 2809, the BS 130 transmits a handover request message to the node 2 120-2. The handover request is a message inquiring of the node 2 120-2 about providing a radio access to the terminal 110. The handover request includes information associated with the terminal 110. For example, the information associated with the terminal 110 may include at least one of identification information of the terminal 110 and a required service level (e.g., a transmission rate, an amount of resources, a type of service, and the like).

In operation 2811, the node 2 120-2 transmits ACK to the BS 130 in response to the handover request. The node 120-2 determines whether providing a radio access to the terminal 110 is possible, and determines that the terminal 110 is acceptable. The node 120-2 may perform admission control, and may transmit an ACK message which reports that handover is possible. In this instance, the node 2 120-2 allocates a resource for the best beam feedback of the terminal 110, and reports a resource allocation result. The ACK message may include time slot information allocated for the best beam feedback.

In operation 2813, the BS 130 transmits a handover command message to the terminal 110. The handover command message instructs the UE 110 to perform handover to the node 2 120-2. The handover command message includes information associated with a resource allocated for the best beam feedback, for example, time slot information.

In operation 2815, the terminal 110 transmits a handover complete message to the BS 130. The handover complete message is a response indicating that the instruction associated with handover is received.

In operation 2817, the terminal 110 receives a beacon transmitted from the node 2 120-2. The beacon may be repeatedly transmitted using different beams. The node 2 120-2 may transmit beacons which are beam-formed as different beams. Accordingly, the terminal 110 may select the best beam based on a reception signal strength of each beam or the like. The beacon may be transmitted at intervals of 20 ms.

In operation 2819, the terminal 110 transmits a beam feedback to the node 2 120-2. The terminal 110 uses resource allocation information included in the handover command message received in operation 2813. The terminal 110 transmits information indicating the best beam through a time slot allocated for the best beam feedback.

In operation 2821, the node 2 120-2 transmits a beam feedback ACK to the terminal 110. The node 2 120-2 reports, to the terminal 110, that the beam feedback is received.

In the above-described detailed embodiments of the present disclosure, a component included in the present disclosure is expressed in the singular or the plural according to a presented detailed embodiment. However, the singular form or plural form is selected for convenience of description suitable for the presented situation, and various embodiments of the present disclosure are not limited to a single element or multiple elements thereof. Further, either multiple elements expressed in the description may be configured into a single element or a single element in the description may be configured into multiple elements.

Embodiments of the present invention according to the claims and description in the specification can be realized in the form of hardware, software or a combination of hardware and software.

Such software may be stored in a computer readable storage medium. The computer readable storage medium stores one or more programs (software modules), the one or more programs comprising instructions, which when executed by one or more processors in an electronic device, cause the electronic device to perform methods of the present invention.

Such software may be stored in the form of volatile or non-volatile storage such as, for example, a storage device like a Read Only Memory (ROM), or in the form of memory such as, for example, Random Access Memory (RAM), memory chips, device or integrated circuits or on an optically or magnetically readable medium such as, for example, a Compact Disc (CD), Digital Video Disc (DVD), magnetic disk or magnetic tape or the like. It will be appreciated that the storage devices and storage media are embodiments of machine-readable storage that are suitable for storing a program or programs comprising instructions that, when executed, implement embodiments of the present invention. Embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for operating a terminal connecting with a serving cell in a wireless communication system, the method comprising:
receiving synchronization sequences from the serving cell and at least one other neighbor cell;
starting a timer when a condition is satisfied, wherein the condition is defined based on reception signal strengths of the synchronization sequences;
transmitting, to the serving cell, a request not to transmit data to the terminal during a predetermined duration;
receiving, from the at least one other neighbor cell, at least one signal including a synchronization sequence and control information;
determining whether the timer is expired;
decoding the control information during the predetermined duration, if the at least one signal is received before the timer is expired;
identifying the at least one other neighbor cell based on the synchronization sequence and the decoded control information;
detecting a collision of synchronization sequences between access nodes; and
transmitting a message including information associated with the collision,
wherein the decoding of the control information comprises decoding the control information during the predetermined duration if reception signal strength of the at least one signal satisfies the condition for determining handover.

2. The method of claim 1,
wherein the condition is that reception signal strengths of the synchronization sequences from the at least one other neighbor cell is greater than a sum of reception signal strength of the synchronization sequence from the serving cell and a predetermined offset.

3. The method of claim 1, further comprising:
receiving a message including information associated with the collision of synchronization sequences between the access nodes.

4. A terminal apparatus connecting with a serving cell in a wireless communication system, the apparatus comprising:
a transceiver; and
at least one processor coupled to the transceiver, and configured to:
receive synchronization sequences from the serving cell and at least one other neighbor cell,
start a timer when a condition is satisfied, wherein the condition is defined based on reception signal strengths of the synchronization sequences,
transmit, to the serving cell, a request not to transmit data to the terminal during a predetermined duration,
receive, from the at least one other neighbor cell, at least one signal including a synchronization sequence and control information;
determine whether the timer is expired,
decode the control information during the predetermined duration, if the at least one signal is received before the timer is expired,
identify the at least one other neighbor cell based on the synchronization sequence and the decoded control information,
detect a collision of synchronization sequences between access nodes, and
transmit a message including information associated with the collision,
wherein the control information is decoded during the predetermined duration if reception signal strength of the at least one signal satisfies the condition for determining handover.

5. The apparatus of claim 4,
wherein the processor is further configured to, if a condition is satisfied, decode the control information included in the at least one signal that is received during the predetermined duration, and
wherein the condition is defined based on reception signal strengths of the at least one signal.

6. The apparatus of claim 4, wherein the at least one processor is further configured to transmit a message requesting allocation of a gap of the predetermined duration for decoding the control information.

7. The apparatus of claim 4, wherein the at least one processor is further configured to receive a message including information associated with a synchronization sequence collision between the access nodes.

8. The apparatus of claim 7, wherein the at least one processor is further configured to suspend decoding the control information included in the at least one signal that is transmitted from the at least one other neighbor cell if identification information included in the control information is not included in the information associated with the collision.

* * * * *